United States Patent
Otsuka et al.

(10) Patent No.: US 12,005,960 B2
(45) Date of Patent: Jun. 11, 2024

(54) FRONT PILLAR OUTER

(71) Applicant: NIPPON STEEL CORPORATION, Tokyo (JP)

(72) Inventors: Kenichiro Otsuka, Tokyo (JP); Masafumi Azuma, Tokyo (JP); Naoki Kimoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 358 days.

(21) Appl. No.: 17/625,678

(22) PCT Filed: Jul. 14, 2020

(86) PCT No.: PCT/JP2020/027363
§ 371 (c)(1),
(2) Date: Jan. 7, 2022

(87) PCT Pub. No.: WO2021/010393
PCT Pub. Date: Jan. 21, 2021

(65) Prior Publication Data
US 2022/0250687 A1 Aug. 11, 2022

(30) Foreign Application Priority Data
Jul. 16, 2019 (JP) .................. 2019-131350

(51) Int. Cl.
*B62D 25/04* (2006.01)
*B62D 21/15* (2006.01)
*B62D 27/02* (2006.01)

(52) U.S. Cl.
CPC ........... *B62D 25/04* (2013.01); *B62D 21/152* (2013.01)

(58) Field of Classification Search
USPC ....................... 296/193.06, 29, 30
See application file for complete search history.

(56) References Cited

U.S. PATENT DOCUMENTS

2017/0106917 A1  4/2017 Mashio et al.

FOREIGN PATENT DOCUMENTS

| JP | 5-310147 A | 11/1993 |
|---|---|---|
| JP | 2014-118009 A | 6/2014 |
| JP | 2016-2781 A | 1/2016 |

*Primary Examiner* — Dennis H Pedder
(74) *Attorney, Agent, or Firm* — Birch, Stewart, Kolasch & Birch, LLP

(57) ABSTRACT

An objective of the present disclosure is to provide a front pillar outer that is inexpensive, lightweight and strong. In an area in which a first door-side flange part and a second door-side flange part overlap with each other, a first plate part that is connected to a side edge of the first door-side flange part is folded so that a second door-side flange part is sandwiched between the first door-side flange part and the folded first plate part. In an area in which a first glass-face-side flange part and a second glass-face-side flange part overlap with each other, a second plate part that is connected to a side edge of the first glass-face-side flange part is folded so that the second glass-face-side flange part is sandwiched between the first glass-face-side flange part and the folded second plate part.

8 Claims, 12 Drawing Sheets

FRONT PILLAR OUTER

TECHNICAL FIELD

The present invention relates to a front pillar outer that forms a front pillar.

BACKGROUND ART

A vehicle body of an automobile includes a front pillar. The front pillar is formed by a combination of a front pillar inner, a front pillar outer and the like. From the viewpoint of improving the fuel consumption of the automobile, the front pillar is desirably lightweight. On the other hand, from the viewpoint of improving the collision safety, the front pillar desirably has high strength. Therefore, there is a demand for reducing the weight and improving the strength of the front pillar.

Vehicle body components improved in strength are described in Japanese Patent Application Publication No. 2014-118009 (Patent Literature 1), Japanese Patent Application Publication No. 5-310147 (Patent Literature 2), and Japanese Patent Application Publication No. 2016-2781 (Patent Literature 3), for example.

In Patent Literature 1, a front pillar lower provided with a reinforcement component is described. The reinforcement component described in Patent Literature 1 includes a vertical face part opposed to a front wheel and a horizontal face part having high strength. When a head-on collision of the vehicle occurs, the front wheel moves toward the rear of the vehicle. The vertical face part limits the movement of the front wheel toward the rear of the vehicle. The horizontal face part absorbs the collision energy applied to the vertical face part. In Patent Literature 1, it is disclosed that the deformation of the front pillar lower caused by the collision can be reduced in this way.

The vehicle body component disclosed in Patent Literature 2 has a first structure that has a closed cross section, and a second structure that has a closed cross section and is welded to the first structure. Therefore, the vehicle body component includes a portion formed by only the first structure and a portion formed by the first structure and the second structure. In short, the vehicle body component includes two portions having different plate thicknesses. In Patent Literature 2, it is disclosed that the collision energy absorption capacity of the vehicle body component is improved in this way.

The vehicle body component disclosed in Patent Literature 3 has a first component having a U-shape, and a second component having a U-shape. A slit is formed in each of an end part of the first component and an end part of the second component. With the slit of the first component being arranged to overlap with the slit of the second component, the first component and the second component are welded to each other. In other words, in a part of the vehicle body component, the two components overlap with each other, and therefore, the strength is increased. In Patent Literature 3, it is disclosed that the vehicle body component has high strength even if the vehicle body component is not provided with a reinforcement plate or the like as a separate member.

In other techniques for reducing weight and improving strength than Patent Literatures 1 to 3, a tailored welded blank (referred to also as TWB, hereinafter) or a tailored rolled blank (referred to also as TRB, hereinafter) can be used as the material of the front pillar. Alternatively, a reinforcement plate can also be attached to a part of the front pillar.

TWB is a material formed by a plurality of metal plates that are different in material or plate thickness and combined by welding. A component made of TWB partially has one or both of variations in plate thickness and variations in strength.

TRB is a metal plate that is formed by special rolling and has a continuously varying plate thickness. A component made of TRB partially has one or both of variations in plate thickness and variations in strength.

CITATION LIST

Patent Literature

Patent Literature 1: Japanese Patent Application Publication No. 2014-118009
Patent Literature 2: Japanese Patent Application Publication No. 5-310147
Patent Literature 3: Japanese Patent Application Publication No. 2016-2781

SUMMARY OF INVENTION

Technical Problem

However, the front pillar lower described in Patent Literature 1 is provided with a reinforcement component as a separate member. The vehicle body component described in Patent Literature 2 has the second structure that is welded to the first structure along the longitudinal direction of the first structure. With the vehicle body component described in Patent Literature 3, the first component and the second component are welded over the entire cross section in the weld zone of the first component and the second component. Therefore, the vehicle body components according to Patent Literatures 1 to 3 are heavy.

In addition, since TWB is a plurality of metal plates joined to each other, an additional joining process is needed for producing TWB. Therefore, components formed from TWB are expensive. A joining process is also needed for producing a component reinforced with a reinforcement plate. Therefore, such a component is also expensive. Production of TRB is highly costly. Therefore, components formed from TRB are also expensive.

An objective of the present invention is to provide a front pillar outer that is inexpensive, lightweight and strong.

Solution to Problem

A front pillar outer according to an embodiment of the present invention includes a glass-face-side flange part, a door-side flange part, and a main body part that connects the glass-face-side flange part and the door-side flange part to each other. The front pillar outer has a first member and a second member.

The first member extends in a longitudinal direction from a fore end toward a rear end of the front pillar outer. The first member includes a first glass-face-side flange part, a first door-side flange part, and a first main body part that connects the first glass-face-side flange part and the first door-side flange part to each other. The first glass-face-side flange part forms a part of the glass-face-side flange part. The first door-side flange part forms a part of the door-side flange part. The first main body part forms a part of the main body part.

The second member extends in the longitudinal direction from the rear end toward the fore end of the front pillar outer.

The second member includes a second glass-face-side flange part, a second door-side flange part, and a second main body part that connects the second glass-face-side flange part and the second door-side flange part to each other. The second glass-face-side flange part forms a part of the glass-face-side flange part. The second door-side flange part forms a part of the door-side flange part. The second main body part forms a part of the main body part.

A rear end of the first door-side flange part is located more rearward than a rear end of the first glass-face-side flange part and a rear end of the first main body part. A fore end of the second glass-face-side flange part is located more forward than a fore end of the second door-side flange part and a fore end of the second main body part. The first door-side flange part and the second door-side flange part overlap with each other in an area from the rear end of the first door-side flange part to the fore end of the second door-side flange part. The first glass-face-side flange part and the second glass-face-side flange part overlap with each other in an area from the rear end of the first glass-face-side flange part to the fore end of the second glass-face-side flange part. The first main body part and the second main body part overlap with each other in an area from the rear end of the first main body part to the fore end of the second main body part.

In the area in which the first door-side flange part and the second door-side flange part overlap with each other, a first plate part that is connected to a side edge of one door-side flange part of the first door-side flange part and the second door-side flange part is folded so that the other door-side flange part is sandwiched between the one door-side flange part and the folded first plate part. In the area in which the first glass-face-side flange part and the second glass-face-side flange part overlap with each other, a second plate part that is connected to a side edge of one glass-face-side flange part of the first glass-face-side flange part and the second glass-face-side flange part is folded so that the other glass-face-side flange part is sandwiched between the one glass-face-side flange part and the folded second plate part.

Advantageous Effects of Invention

The front pillar outer according to the embodiment of the present invention is inexpensive, lightweight and strong.

DESCRIPTION OF EMBODIMENT

Figure 1:
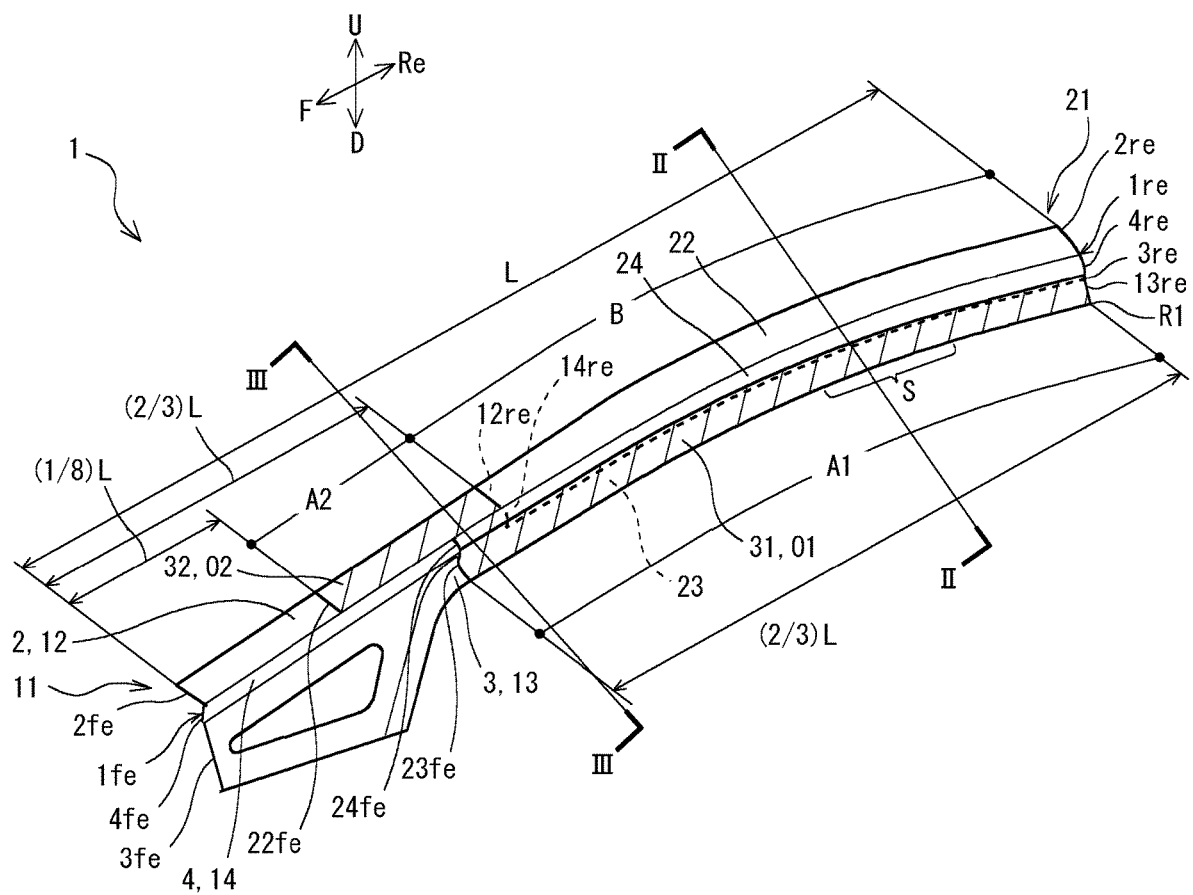
FIG. 1 is a perspective view of an example of a front pillar outer according to an embodiment.

In the following, an embodiment of the present invention will be described. Although examples of the embodiment of the present invention will be described below, the present invention is not limited to the examples described below. Although particular numerical values or particular materials may be referred to as examples in the following description, the present invention is not limited to such examples.

A front pillar outer according to this embodiment includes a glass-face-side flange part, a door-side flange part, and a main body part that connects the glass-face-side flange part and the door-side flange part to each other. The front pillar outer has a first member and a second member.

The first member extends in a longitudinal direction from a fore end toward a rear end of the front pillar outer. The first member includes a first glass-face-side flange part, a first door-side flange part, and a first main body part that connects the first glass-face-side flange part and the first door-side flange part to each other. The first glass-face-side flange part forms a part of the glass-face-side flange part. The first door-side flange part forms a part of the door-side flange part. The first main body part forms a part of the main body part.

The second member extends in the longitudinal direction from the rear end toward the fore end of the front pillar outer. The second member includes a second glass-face-side flange part, a second door-side flange part, and a second main body part that connects the second glass-face-side flange part and the second door-side flange part to each other. The second glass-face-side flange part forms a part of the glass-face-side flange part. The second door-side flange part forms a part of the door-side flange part. The second main body part forms a part of the main body part.

A rear end of the first door-side flange part is located more rearward than a rear end of the first glass-face-side flange part and a rear end of the first main body part. A fore end of the second glass-face-side flange part is located more forward than a fore end of the second door-side flange part and a fore end of the second main body part. The first door-side flange part and the second door-side flange part overlap with each other in an area from the rear end of the first door-side flange part to the fore end of the second door-side flange part. The first glass-face-side flange part and the second glass-face-side flange part overlap with each other in an area from the rear end of the first glass-face-side flange part to the fore end of the second glass-face-side flange part. The first main body part and the second main body part overlap with each other in an area from the rear end of the first main body part to the fore end of the second main body part.

In the area in which the first door-side flange part and the second door-side flange part overlap with each other, a first plate part that is connected to a side edge of one door-side flange part of the first door-side flange part and the second door-side flange part is folded so that the other door-side flange part is sandwiched between the one door-side flange part and the folded first plate part. In the area in which the first glass-face-side flange part and the second glass-face-side flange part overlap with each other, a second plate part that is connected to a side edge of one glass-face-side flange part of the first glass-face-side flange part and the second glass-face-side flange part is folded so that the other glass-face-side flange part is sandwiched between the one glass-face-side flange part and the folded second plate part.

As described above, with the front pillar outer according to this embodiment, the first door-side flange part and the second door-side flange part are fixed to each other by the folded first plate part. Furthermore, the first glass-face-side flange part and the second glass-face-side flange part are fixed to each other by the folded second plate part. In this way, the first member and the second member that overlap with each other are integrated with each other, thereby forming the front pillar outer. In other words, the front pillar outer according to this embodiment is formed by the first member and the second member.

When a collision load is applied to the front pillar outer according to this embodiment, the front pillar outer is curved. As a result, a compressive strain is exerted on a partial area of the door-side flange part along the longitudinal direction. In this specification, the area on which the compressive strain is exerted is referred to also as a "door-side compressive region". On the other hand, a tensile strain is exerted on a partial area of the glass-face-side flange part along the longitudinal direction. In this specification, the area on which the tensile strain is exerted is referred to also as a "glass-face-side tensile region". Furthermore, a compressive strain is exerted on another partial area of the glass-face-side flange part along the longitudinal direction. In this specification, the area on which the compressive strain is exerted is referred to also as a "glass-face-side compressive region". The door-side compressive region and the glass-face-side compressive region are generically referred to also as a compressive strain region. The glass-face-side tensile region is generically referred to also as a "tensile strain region". In a collision, the compressive strain region is likely to buckle.

With the front pillar outer according to this embodiment, the first plate part is disposed in the door-side compressive region. The first plate part is folded onto one of the door-side flange parts (the first door-side flange part, for example) that is connected to the first plate part. In this way, the other door-side flange part (the second door-side flange part, for example) is sandwiched between the one door-side flange part and the folded first plate part. Furthermore, the second plate part is disposed in the glass-face-side compressive region. The second plate part is folded onto one of the glass-face-side flange part (the first glass-face-side flange part, for example) that is connected to the second plate part. In this way, the other glass-face-side flange part (the second glass-face-side flange part, for example) is sandwiched between the one glass-face-side flange part and the folded second plate part. In short, in both the door-side compressive region and the glass-face-side compressive region, three layers of material are stacked on one another.

Here, the collision resistance of the compressive strain region is approximately proportional to the product of the strength of the material and the third power of the plate thickness of the material. Therefore, increasing the plate thickness of the material of the compressive strain region greatly contributes to the improvement of the collision resistance. Specifically, the collision resistance is buckling strength. With the front pillar outer according to this embodiment, in the compressive strain regions (the door-side compressive region and the glass-face-side compressive region), three layers of material are stacked on one another, and the plate thickness is substantially increased. Therefore, the buckling strength of the compressive strain region is significantly improved. In this way, the strength of the front pillar outer can be increased.

With the front pillar outer according to this embodiment, the glass-face-side tensile region is formed by only the second member, that is, a single layer of a single material. Here, the collision resistance of the tensile strain region is proportional to the product of the strength of the material and the plate thickness of the material. Therefore, increasing the plate thickness of the material of the tensile strain region makes a smaller contribution to the improvement of the collision resistance than increasing the plate thickness of the material of the compressive strain region. In order to improve the collision resistance of the tensile strain region, the strength of the material can be increased. If the strength of the material is increased, the collision resistance of the compressive strain region is further improved. With the front pillar outer according to this embodiment, the plate thickness of the tensile strain region does not increase. Therefore, an increase of the weight can be reduced, and the weight of the front pillar outer can be reduced by increasing the strength of the material.

With the front pillar outer according to this embodiment, in the door-side compressive region, the other door-side flange part (the second door-side flange part, for example) is sandwiched between the one door-side flange part (the first door-side flange part, for example) and the folded first plate part. In this way, the first door-side flange part and the second door-side flange part are fixed to each other. Furthermore, the other glass-face-side flange part (the second glass-face-side flange part, for example) is sandwiched between the one glass-face-side flange part (the first glass-face-side flange part, for example) and the folded second plate part. In this way, the first glass-face-side flange part and the second glass-face-side flange part are fixed to each other. In this way, the first member and the second member that overlap with each other are integrated with each other.

In short, in any of the door-side compressive region and the glass-face-side compressive region, by folding the first plate part and the second plate part, the first member and the second member that overlap with each other can be fixed to and integrated with each other without joining the two members. Therefore, the front pillar outer can be produced at low cost. In addition, there is no welded or otherwise joined part, there is no risk of a joined part breaking off in a collision. In addition, since the first plate part and the second plate part are integral with any of the first member and the second member, the risk of the first plate part or the second plate part breaking off in a collision is low.

Of course, if the folded part is joined, the strength is further increased, and the collision resistance is improved. In addition, compared with the case where the members are joined without folding, the stress that occurs in the joined region in a collision is small, and therefore the risk of breaking off is reduced. The joining method may be spot welding, laser welding, arc welding, using an adhesive material, or machine caulking, for example.

The order of stacking of the first member and the second member is not particularly limited. Specifically, the first member may be overlaid on the second member, or the second member may be overlaid on the first member.

The first plate part may be integral with any of the first member and the second member. Specifically, the first plate part may be connected to the first door-side flange part or the second door-side flange part. Similarly, the second plate part may be integral with any of the first member and the second member. Specifically, the second plate part may be connected to the first glass-face-side flange part or the second glass-face-side flange part.

The direction in which each of the first plate part and the second plate part is folded is not particularly limited. Specifically, the first plate part may be folded so as to be exposed to the outside of the front pillar outer or may be folded so as to be hidden behind the front pillar outer. Similarly, the second plate part may be folded so as to be exposed to the outside of the front pillar outer or may be folded so as to be hidden behind the front pillar outer.

However, when it is required to ensure an intimate contact with another component, for example, the direction of folding of the first plate part and the second plate part needs to be determined based on the details of the problem. For example, when the windshield needs to rest on and be in intimate contact with the glass-face-side flange part, if the first plate part and the second plate part are folded to the front side, a step is formed on the glass-face-side flange part, and there is a possibility that the windshield is not in intimate contact with the glass-face-side flange part. If this is a problem, the first plate part and the second plate part need to be folded to the back side.

The front side and the back side of the front pillar outer referred to here means the front side and the back side of the front pillar outer installed in an automobile. Specifically, the front side of the front pillar outer means the outer side of the front pillar outer, and the back side of the front pillar outer means the inner side of the front pillar outer.

In the front pillar outer according to this embodiment, provided that a length of the glass-face-side flange part is denoted by L, the area in which the first plate part, the first door-side flange part, and the second door-side flange part overlap with each other is preferably provided in the door-side flange part over a part or the whole of a range between a position corresponding to a rear end of the glass-face-side flange part and a position at a distance of L×⅔ from the position corresponding to the rear end of the glass-face-side flange part.

In many cases, when a collision load is applied to the front pillar outer, a large compressive strain is likely to occur in the door-side flange part in the curved area close to the rear end of the front pillar outer. In other words, the door-side compressive region is likely to be disposed close to the rear end of the front pillar outer. Therefore, if the first plate part, the first door-side flange part, and the second door-side flange part overlap with each other over a part or the whole of such a range, buckling of the front pillar outer can be further reduced.

In the front pillar outer according to this embodiment, provided that a length of the glass-face-side flange part is denoted by L, the area in which the second plate part, the first glass-face-side flange part, and the second glass-face-side flange part overlap with each other is preferably provided over a part or the whole of a range between a position at a distance of L×⅛ from a fore end of the glass-face-side flange part and a position at a distance of L×⅔ from the fore end of the glass-face-side flange part.

When a collision load is applied to the front pillar outer, a large compressive strain is likely to occur in the glass-face-side flange part in the vicinity of the fore end of the front pillar outer. In other words, the glass-face-side compressive region is likely to be disposed close to the fore end of the front pillar outer. Therefore, if the second plate part, the first glass-face-side flange part, and the second glass-face-side flange part overlap with each other over a part or the whole of such a range, buckling of the front pillar outer can be further reduced.

In the front pillar outer according to this embodiment, it is preferable that the one door-side flange part connected to the first plate part is the first door-side flange part, and the other door-side flange part is the second door-side flange part. Furthermore, it is preferable that the one glass-face-side flange part connected to the second plate part is the first glass-face-side flange part, and the other glass-face-side flange part is the second glass-face-side flange part.

In this case, in the door-side compressive region, the second door-side flange part is sandwiched between the first door-side flange part and the folded first plate part. Furthermore, in the glass-face-side compressive region, the second glass-face-side flange part is sandwiched between the first glass-face-side flange part and the folded second plate part. In short, both the first plate part and the second plate part are integral with the first member. Since the first plate part and the second plate part are integrated into one member (the first member), this form is practical.

In the front pillar outer according to this embodiment, it is preferable that the one door-side flange part connected to the first plate part is the second door-side flange part, and the other door-side flange part is the first door-side flange part. Furthermore, it is preferable that the one glass-face-side flange part connected to the second plate part is the second glass-face-side flange part, and the other glass-face-side flange part is the first glass-face-side flange part.

In this case, in the door-side compressive region, the first door-side flange part is sandwiched between the second door-side flange part and the folded first plate part. Furthermore, in the glass-face-side compressive region, the first glass-face-side flange part is sandwiched between the second glass-face-side flange part and the folded second plate part. In short, both the first plate part and the second plate part are integral with the second member. Since the first plate part and the second plate part are integrated into one member (the second member), this form is practical.

Note that it is possible that the first plate part is integral with the first member, and the second plate part is integral with the second member. Conversely, it is also possible that the first plate part is integral with the second member, and the second plate part is integral with the first member.

In the front pillar outer according to this embodiment, provided that a plate thickness of a first material forming the first plate part and the one door-side flange part connected to the first plate part is denoted by tD, and a plate thickness of the other door-side flange part is denoted by taD, it is preferable that an ultimate deformability $|\varepsilon tD|$ of the first material satisfies a condition expressed by the formula (1), and an uniform elongation $\varepsilon uD$ of the first material is 5% or more. Furthermore, provided that a plate thickness of a second material forming the second plate part and the one glass-face-side flange part connected to the second plate part is denoted by tG, and a plate thickness of the other door-side flange part is denoted by taG, it is preferable that an ultimate deformability $|\varepsilon tG|$ of the second material satisfies a condition expressed by the formula (2), and an uniform elongation $\varepsilon uG$ of the second material is 5% or more.

$$|\varepsilon tD| > \ln((2 \times tD + taD)/(tD + taD)) \qquad (1)$$

$$|\varepsilon tG| > \ln((2 \times tG + taG)/(tG + taG)) \qquad (2)$$

When folding the first plate part onto one door-side flange part connected to the first plate part, the first plate part is folded at an acute angle at a side edge of the one door-side flange part. A crack can occur in the outer surface of the folded part of the first plate part. If the first material satisfies the condition described above, occurrence of a crack in the folded part can be prevented even if the folding is achieved by cold pressing. Similarly, when folding the second plate part onto one glass-face-side flange part connected to the second plate part, the second plate part is folded at an acute angle at a side edge of the one glass-face-side flange part. A crack can occur in the outer surface of the folded part of the second plate part. If the second material satisfies the condition described above, occurrence of a crack in the folded part can be prevented even if the folding is achieved by cold pressing.

The folding of each of the first plate part and the second plate part is preferably achieved by cold pressing, since the cold pressing is easy. In this case, in order to prevent a crack from occurring in the folded part of each of the first plate part and the second plate part, the first material and the second material need to satisfy the conditions described above. Of course, the folding of each of the first plate part and the second plate part can also be achieved by hot stamping.

Note that the first material and the second material are not necessarily different. For example, when the first plate part and the second plate part are integral with the first member, the first material and the second material are the same as the material of the first member. Similarly, when the first plate part and the second plate part are integral with the second member, the first material and the second material are the same as the material of the second member. On the other hand, when the first plate part is integral with the first member, and the second plate part is integral with the second member, the first material and the second material are different. Similarly, when the first plate part is integral with the second member, and the second plate part is integral with the first member, the first material and the second material are different.

In the front pillar outer described above, the plate thickness of the first member and the second member is not particularly limited. Practically, the plate thickness is preferably 0.60 mm or more to 1.60 mm or less. The lower limit of the plate thickness is more preferably 0.85 mm. The upper limit of the plate thickness is more preferably 1.05 mm. The plate thickness of the first member may be the same as or different from the plate thickness of the second member. Any of the first member and the second member can be thicker than the other.

The tensile strength (the strength of the material) of the first member and the second member is preferably 800 MPa or more. The lower limit of the tensile strength is more preferably 1200 MPa. The tensile strength of the first member may be the same or different from the tensile strength of the second member.

In this case, the front pillar outer is suitable as a front pillar outer for an automobile.

In this specification, each direction of the front pillar outer means a direction of the front pillar outer installed in an automobile. For example, "forward", "rearward", "left", "right", "upward", and "downward" directions agree with the respective directions of an automobile. In the drawings, symbols "F", "Re", "Le", "R", "U", and "D" mean forward, rearward, left, right, upward, and downward directions of an automobile. In this specification, unless otherwise specified, the term "longitudinal direction" means a direction from the fore end to the rear end of the front pillar outer. The term "cross section" means a cross section that is perpendicular to the longitudinal direction of the front pillar outer.

In the following, the embodiment of the present invention will be described in detail with reference to the drawings. In the drawings, the same or corresponding parts are denoted by the same reference numerals, and redundant descriptions thereof will be omitted.

[Overview of Front Pillar Outer 1]

Figure 2:
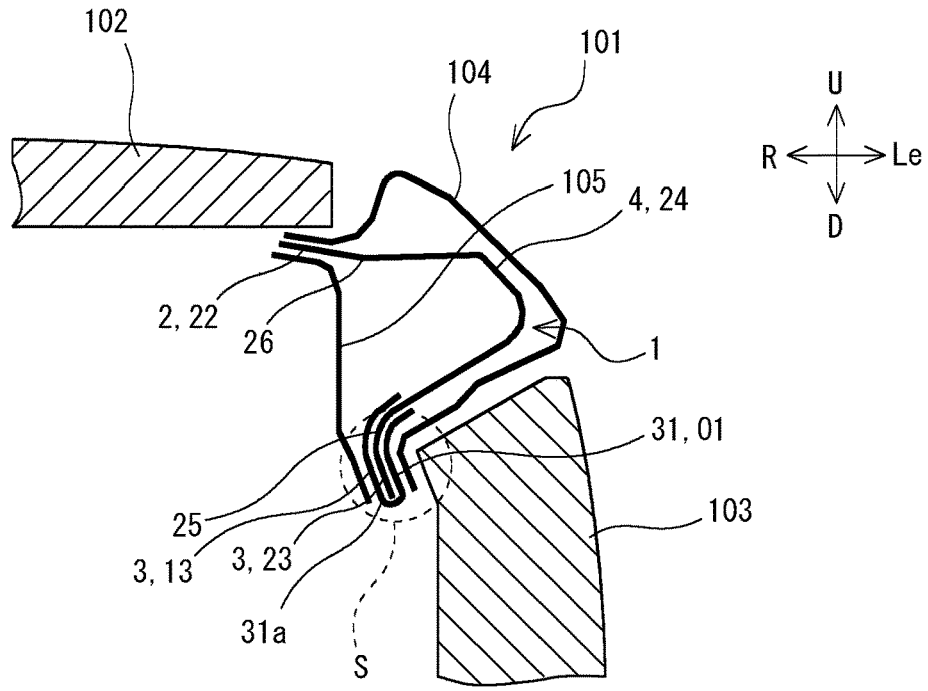
FIG. 2 is a cross-sectional view of a front pillar taken along a line II-II in FIG. 1.
Figure 3:
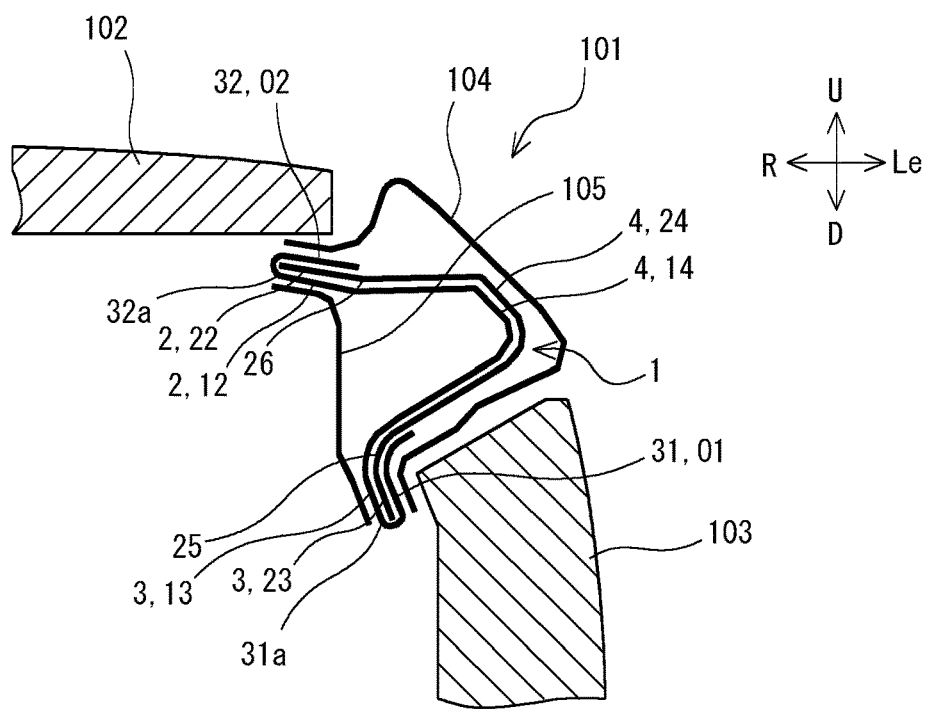
FIG. 3 is a cross-sectional view of the front pillar taken along a line in FIG. 1.
Figure 4:
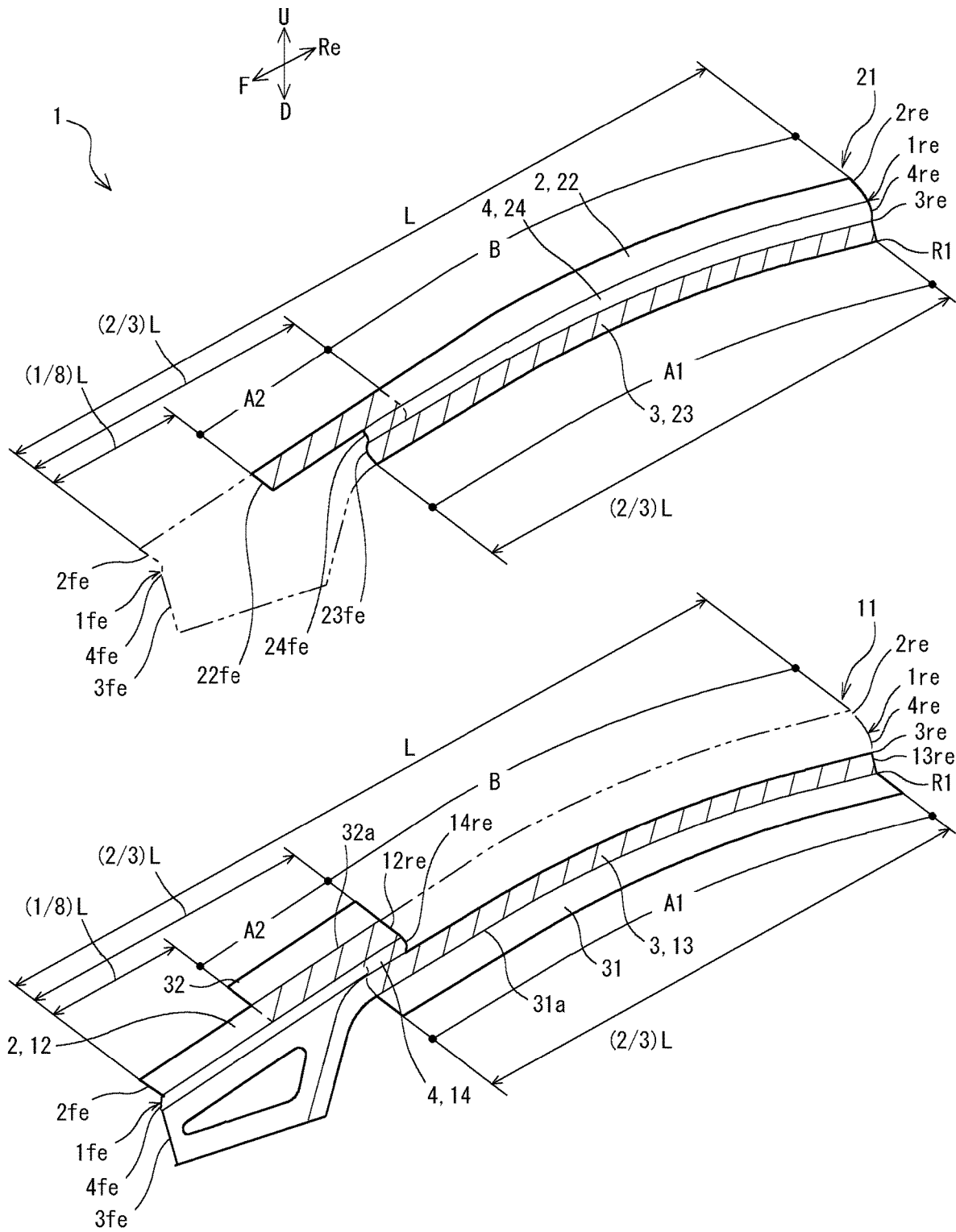
FIG. 4 is a perspective exploded view of the front pillar outer shown in FIG. 1.

FIG. 1 is a perspective view of an example of a front pillar outer 1 according to this embodiment. FIG. 2 is a cross-sectional view of a front pillar 101 taken along a line II-II in FIG. 1. FIG. 2 shows a cross section of a part of the front pillar outer 1 that is close to a rear end 1re thereof. The cross section shown in FIG. 2 includes a door-side compressive region A1. FIG. 3 is a cross-sectional view of the front pillar 101 taken along a line in FIG. 1. FIG. 3 shows a cross section of a part of the front pillar outer 1 that is close to a fore end 1fe thereof. The cross section shown in FIG. 3 includes a glass-face-side compressive region A2 and the door-side compressive region A1. FIG. 4 is a perspective exploded view of the front pillar outer 1 shown in FIG. 1. The front pillar outer 1 shown in FIG. 1 to FIG. 4 is one of two front pillar outers of an automobile that is disposed on the left side of the automobile. Note that, in a first member 11 and a second member 21 in FIG. 4, the contour of the front pillar outer 1 is partially shown by an imaginary line (an alternate long and two short dashes line).

With reference to FIG. 2 and FIG. 3, the front pillar 101 supports a windshield 102. More strictly, the front pillar 101 referred to here is a front pillar upper forming a chassis of a vehicle body. The front pillar outer 1 is one of members forming the front pillar upper.

The front pillar 101 includes a side panel 104, a front pillar inner 105, and the front pillar outer 1. The side panel 104 is disposed on the outer side of the front pillar inner 105 and the front pillar outer 1. The side panel 104 and the front pillar inner 105 form a closed cross section. The front pillar outer 1 is disposed inside the closed cross section. The front pillar outer 1 serves to reinforce the front pillar 101.

With reference to FIG. 1 to FIG. 4, the front pillar outer 1 includes a glass-face-side flange part 2, a door-side flange part 3, and a main body part 4. The main body part 4 is disposed between the glass-face-side flange part 2 and the door-side flange part 3 in the width direction of the front pillar outer 1. The main body part 4 connects the glass-face-side flange part 2 and the door-side flange part 3 to each other.

The front pillar outer 1 is formed by the first member 11 and the second member 21 that will be described in detail later. The glass-face-side flange part 2 of the front pillar outer 1 is formed by a first glass-face-side flange part 12 of the first member 11 and a second glass-face-side flange part 22 of the second member 21 that partially overlap with each other. The door-side flange part 3 is formed by a first door-side flange part 13 of the first member 11 and a second door-side flange part 23 of the second member 21 that partially overlap with each other. The main body part 4 is formed by a first main body part 14 of the first member 11 and a second main body part 24 of the second member 21 that partially overlap with each other.

In short, in the front pillar outer 1 according to this embodiment, the glass-face-side flange part 2 is a part formed by the first glass-face-side flange part 12 and the second glass-face-side flange part 22. The door-side flange part 3 is a part formed by the first door-side flange part 13 and the second door-side flange part 23. The main body part 4 is a part formed by the first main body part 14 and the second main body part 24.

The glass-face-side flange part 2 of the front pillar outer 1 is joined to the side panel 104 and the front pillar inner 105 by welding or the like. The glass-face-side flange part 2 includes an area that directly or indirectly supports a side edge of the windshield 102. The glass-face-side flange part 2 supports the side edge of the windshield 102 in cooperation with the side panel 104 and the front pillar inner 105.

The door-side flange part 3 is joined to the side panel 104 and the front pillar inner 105 by welding or the like. The door-side flange part 3 includes an area that is directly or indirectly opposed to an upper edge of the door 103. The door-side flange part 3 is opposed to the upper edge of the door 103 along with the side panel 104 and the front pillar inner 105. The cross-sectional shape of the front pillar outer 1 is a hat-like shape.

With reference to FIG. 1 to FIG. 4, the door-side flange part 3 includes the door-side compressive region A1. The door-side compressive region A1 is a partial area of the door-side flange part 3 along the longitudinal direction. A compressive strain is applied to the door-side compressive region A1 when a collision load is applied to the front pillar outer 1.

The glass-face-side flange part 2 includes the glass-face-side compressive region A2. The glass-face-side compressive region A2 is a partial area of the glass-face-side flange part 2 along the longitudinal direction. A compressive strain is applied to the glass-face-side compressive region A2 when a collision load is applied to the front pillar outer 1.

The glass-face-side flange part 2 further includes a glass-face-side tensile region B. The glass-face-side tensile region B is a partial area of the glass-face-side flange part 2 along the longitudinal direction. A tensile strain is applied to the glass-face-side tensile region B when a collision load is applied to the front pillar outer 1.

The door-side compressive region A1 is disposed closer to the rear end 1re of the front pillar outer 1. The glass-face-side compressive region A2 is disposed closer to the fore end 1fe of the front pillar outer 1. The glass-face-side tensile region B is located more rearward than the glass-face-side compressive region A2. The glass-face-side tensile region B is adjacent to the glass-face-side compressive region A2 and extends to a rear end 2re of the glass-face-side flange part 2.

Next, the first member 11 and the second member 21 forming the front pillar outer 1 will be described.

[First Member 11]

The first member 11 extends in the longitudinal direction from the fore end 1fe toward the rear end 1re of the front pillar outer 1. The first member 11 includes the first glass-face-side flange part 12, the first door-side flange part 13, and the first main body part 14. The first glass-face-side flange part 12 forms a part of the glass-face-side flange part 2. The first door-side flange part 13 forms a part of the door-side flange part 3. The first main body part 14 forms a part of the main body part 4, and connects the first glass-face-side flange part 12 and the first door-side flange part 13 to each other.

The first door-side flange part 13 extends in the longitudinal direction from a position corresponding to the fore end 1fe of the front pillar outer 1. In the example shown in FIG. 1 and FIG. 4, the first door-side flange part 13 is provided over the whole of a range between a position corresponding to the fore end 1fe of the front pillar outer 1 and a position corresponding to the rear end 1re of the same. In this case, in the longitudinal direction of the front pillar outer 1, the area of the first door-side flange part 13 agrees with the area of the door-side flange part 3. In the longitudinal direction of the front pillar outer 1, the first door-side flange part 13 includes the door-side compressive region A1.

The first glass-face-side flange part 12 extends in the longitudinal direction from a position corresponding to the fore end 1fe of the front pillar outer 1. However, the first glass-face-side flange part 12 does not extend to a position corresponding to the rear end 1re of the front pillar outer 1. In other words, the first glass-face-side flange part 12 is provided over a range between a position corresponding to the fore end 1fe of the front pillar outer 1 and a position at a predetermined distance from the position corresponding to the fore end 1fe. In the longitudinal direction of the front pillar outer 1, the first glass-face-side flange part 12 includes the glass-face-side compressive region A2. However, the first glass-face-side flange part 12 does not include the glass-face-side tensile region B. In this case, the first glass-face-side flange part 12 is not present in a region close to the rear end 2re of the glass-face-side flange part 2.

The first main body part 14 is disposed between the first glass-face-side flange part 12 and the first door-side flange part 13 in the lateral direction of the front pillar outer 1. The first main body part 14 extends in the longitudinal direction from a position corresponding to the fore end 1fe of the front pillar outer 1. However, as with the first glass-face-side flange part 12, the first main body part 14 does not extend to a position corresponding to the rear end 1re of the front pillar outer 1. In other words, the first main body part 14 is provided over a range between a position corresponding to the fore end 1fe of the front pillar outer 1 and a position at a predetermined distance from the position corresponding to the fore end 1fe. In the longitudinal direction of the front pillar outer 1, the area of the first main body part 14 agrees with the area of the first glass-face-side flange part 12. In this case, the first main body part 14 is not present in a region close to a rear end 4re of the main body part 4.

As can be seen from the above description, in the first member 11, a rear end 13re of the first door-side flange part 13 is located more rearward than a rear end 12re of the first glass-face-side flange part 12 and a rear end 14re of the first main body part 14.

[Second Member 21]

The second member 21 extends in the longitudinal direction from the rear end 1re toward the fore end 1fe of the front pillar outer 1. The second member 21 includes the second glass-face-side flange part 22, the second door-side flange part 23, and the second main body part 24. The second glass-face-side flange part 22 forms a part of the glass-face-side flange part 2. The second door-side flange part 23 forms a part of the door-side flange part 3. The second main body part 24 forms a part of the main body part 4, and connects the second glass-face-side flange part 22 and the second door-side flange part 23 to each other.

The second glass-face-side flange part 22 extends in the longitudinal direction from a position corresponding to the rear end 1re of the front pillar outer 1. However, the second glass-face-side flange part 22 does not extend to a position corresponding to the fore end 1fe of the front pillar outer 1. In other words, the second glass-face-side flange part 22 is provided over a range between a position corresponding to the rear end 1re of the front pillar outer 1 and a position at a predetermined distance from the position corresponding to the rear end 1re. In the longitudinal direction of the front pillar outer 1, the second glass-face-side flange part 22 is provided in the glass-face-side tensile region B and the glass-face-side compressive region A2. In this case, the second glass-face-side flange part 22 is not present in a region close to the fore end 2*fe* of the glass-face-side flange part 2.

The second door-side flange part 23 extends in the longitudinal direction from a position corresponding to the rear end 1*re* of the front pillar outer 1. However, the second glass-face-side flange part 22 does not extend to a position corresponding to the fore end 1*fe* of the front pillar outer 1. In other words, the second door-side flange part 23 is provided over a range between a position corresponding to the rear end 1*re* of the front pillar outer 1 and a position at a predetermined distance from the position corresponding to the rear end 1*re*. In the longitudinal direction of the front pillar outer 1, the second door-side flange part 23 is provided in the door-side compressive region A1. In this case, the second door-side flange part 23 is not present in a region close to a fore end 3*fe* of the door-side flange part 3.

The second main body part 24 is disposed between the second glass-face-side flange part 22 and the second door-side flange part 23 in the lateral direction of the front pillar outer 1. The second main body part 24 extends in the longitudinal direction from a position corresponding to the rear end 1*re* of the front pillar outer 1. However, as with the second door-side flange part 23, the second main body part 24 does not extend to a position corresponding to the fore end 1*fe* of the front pillar outer 1. In other words, the second main body part 24 is provided over a range between a position corresponding to the rear end 1*re* of the front pillar outer 1 and a position at a predetermined distance from the position corresponding to the rear end 1*re*. In the longitudinal direction of the front pillar outer 1, the area of the second main body part 24 agrees with the area of the second door-side flange part 23. In this case, the second main body part 24 is not present in a region close to a fore end 4*fe* of the main body part 4.

As can be seen from the above description, in the second member 21, a fore end 22*fe* of the second glass-face-side flange part 22 is located more forward than a fore end 23*fe* of the second door-side flange part 23 and a fore end 24*fe* of the second main body part 24.

[Front Pillar Outer 1 Formed by First Member 11 and Second Member 21]

The first door-side flange part 13 and the second door-side flange part 23 overlap with each other in the area from the rear end 13*re* of the first door-side flange part 13 to the fore end 23*fe* of the second door-side flange part 23. In other words, the first door-side flange part 13 and the second door-side flange part 23 overlap with each other in the area of the door-side compressive region A1. The first glass-face-side flange part 12 and the second glass-face-side flange part 22 overlap with each other in the area from the rear end 12*re* of the first glass-face-side flange part 12 to the fore end 22*fe* of the second glass-face-side flange part 22. In other words, the first glass-face-side flange part 12 and the second glass-face-side flange part 22 overlap with each other in the area of the glass-face-side compressive region A2. Furthermore, the first main body part 14 and the second main body part 24 overlap with each other in the area from the rear end 14*re* of the first main body part 14 to the fore end 24*fe* of the second main body part 24.

A first plate part 31 is disposed over the whole range of the door-side compressive region A1. In the example shown in FIG. 1 to FIG. 4, in the door-side compressive region A1, the first plate part 31 is connected to a side edge 31*a* (see FIGS. 2 to 4) of the first door-side flange part 13, of the first door-side flange part 13 and the second door-side flange part 23 that overlap with each other. The first plate part 31 is a part of the first door-side flange part 13 protruding beyond the side edge 31*a*, and is integral with the first door-side flange part 13. The first plate part 31 is folded onto the first door-side flange part 13. In this way, the second door-side flange part 23 is sandwiched between the first door-side flange part 13 and the folded first plate part 31.

In short, over the whole range of the door-side compressive region A1, three layers of material are stacked on one another. As a result, the thickness of the door-side compressive region A1 is substantially increased over the whole range thereof. Therefore, the buckling strength of the door-side compressive region A1 is significantly improved. In this way, the strength of the front pillar outer 1 can be increased.

In the door-side compressive region A1, the first door-side flange part 13 and the second door-side flange part 23 are fixed to each other by sandwiching the second door-side flange part 23 between the first door-side flange part 13 and the folded first plate part 31. In this way, the first member 11 and the second member 21 that overlap with each other are integrated with each other.

In short, in the door-side compressive region A1, by folding the first plate part 31, the first member 11 and the second member 21 that overlap with each other can be fixed to and integrated with each other without joining the two members. Therefore, the front pillar outer 1 can be produced at low cost. In addition, there is no welded or otherwise joined part, there is no risk of a joined part breaking off in the case of a collision.

Of course, if the folded part is joined, the strength is further increased, and the collision resistance is improved. In addition, compared with the case where the members are joined without folding, the stress that occurs in the joined region in the case of a collision is small, and therefore the risk of breaking off is reduced. The joining method may be spot welding, laser welding, arc welding, using an adhesive material, or machine caulking, for example.

What contributes to the fixing of the first member 11 and the second member 21 to each other is the first plate part 31. The first plate part 31 is continuously connected to the first door-side flange part 13 along the longitudinal direction, and is integral with the first member 11. Therefore, the risk of the first plate part 31 breaking off in the case of a collision is low.

Note that the first plate part 31 is not arranged in the other areas of the door-side flange part 3 than the door-side compressive region A1.

In the example shown in FIG. 1 to FIG. 4, the first member 11 is arranged below the second member 21, and the first plate part 31 that is integral with the first member 11 is folded so as to be exposed to the outside and is overlaid on the surface of the second door-side flange part 23. A part of the first plate part 31 may lie over a ridge part 25 that connects the second door-side flange part 23 and the second main body part 24 to each other or may further lie over the second main body part 24.

In the example shown in FIG. 1 to FIG. 4, an overlapping area O1 in which the first plate part 31, the first door-side flange part 13 and the second door-side flange part 23 overlap with each other agrees with the range of the door-side compressive region A1. In this specification, the overlapping area O1 is referred to also as a "door-side overlapping area". Provided that the length of the glass-face-side flange part 2 is denoted by L, the range of the door-side compressive region A1 is a range on the door-side flange part 3 between a position corresponding to the rear end 2*re* of the glass-face-side flange part 2 and a position at a distance of $L \times 2/3$ from the position corresponding to the rear end 2re of the glass-face-side flange part 2. Therefore, the door-side overlapping area O1 is provided over the whole range of the door-side compressive region A1. However, the door-side overlapping area O1 may be provided over a part of the range of the door-side compressive region A1. For example, the compressive strain may be small in an area close to the rear end 3re of the door-side flange part 3. In that case, the first plate part 31 need not be present in the area close to the rear end 3re of the door-side flange part 3.

A second plate part 32 is disposed over the whole range of the glass-face-side compressive region A2. In the glass-face-side compressive region A2, the second plate part 32 is connected to a side edge 32a (see FIGS. 3 and 4) of the first glass-face-side flange part 12, of the first glass-face-side flange part 12 and the second glass-face-side flange part 22 that overlap with each other. The second plate part 32 is a part of the first glass-face-side flange part 12 that protrudes beyond the side edge 32a, and is integral with the first glass-face-side flange part 12. The second plate part 32 is folded onto the first glass-face-side flange part 12. In this way, the second glass-face-side flange part 22 is sandwiched between the first glass-face-side flange part 12 and the folded second plate part 32.

In short, over the whole range of the glass-face-side compressive region A2, three layers of material are stacked on one another. As a result, the plate thickness of the glass-face-side compressive region A2 is substantially increased over the whole range thereof. Therefore, the buckling strength of the glass-face-side compressive region A2 is significantly improved. In this way, the strength of the front pillar outer 1 can be increased.

In the glass-face-side compressive region A2, the first glass-face-side flange part 12 and the second glass-face-side flange part 22 are fixed to each other by sandwiching the second glass-face-side flange part 22 between the first glass-face-side flange part 12 and the folded second plate part 32. In this way, the first member 11 and the second member 21 that overlap with each other are integrated with each other.

In short, in the glass-face-side compressive region A2, by folding the second plate part 32, the first member 11 and the second member 21 that overlap with each other can be fixed to and integrated with each other without joining the two members. Therefore, the front pillar outer 1 can be produced at low cost. In addition, there is no welded or otherwise joined part, there is no risk of a joined part breaking off in the case of a collision.

Of course, if the folded part is joined, the strength is further increased, and the collision resistance is improved. In addition, compared with the case where the members are joined without folding, the stress that occurs in the joined region in the case of a collision is small, and therefore the risk of breaking off is reduced. The joining method may be spot welding, laser welding, arc welding, using an adhesive material, or machine caulking, for example.

What contributes to the fixing of the first member 11 and the second member 21 to each other is the second plate part 32. The second plate part 32 is continuously connected to the first glass-face-side flange part 12 in the longitudinal direction, and is integral with the first member 11. Therefore, the risk of the second plate part 32 breaking off in the case of a collision is low.

Note that the second plate part 32 is not arranged in the other areas of the glass-face-side flange part 2 than the glass-face-side compressive region A2.

In the example shown in FIG. 1 to FIG. 4, the first member 11 is arranged below the second member 21, and the second plate part 32 that is integral with the first member 11 is folded so as to be exposed to the outside of the front pillar outer 1 and is overlaid on the surface of the second glass-face-side flange part 22. A part of the second plate part 32 may lie over a ridge part 26 that connects the second glass-face-side flange part 22 and the second main body part 24 to each other or may further lie over the second main body part 24.

In the example shown in FIG. 1 to FIG. 4, an overlapping area O2 in which the second plate part 32, the first glass-face-side flange part 12 and the second glass-face-side flange part 22 overlap with each other agrees with the range of the glass-face-side compressive region A2. In this specification, the overlapping area O2 is referred to also as a "glass-face-side overlapping area". Provided that the length of the glass-face-side flange part 2 is denoted by L, the range of the glass-face-side compressive region A2 is a range between a position at a distance of $L \times \frac{1}{8}$ from the fore end 2fe of the glass-face-side flange part 2 and a position at a distance of $L \times \frac{2}{3}$ from the fore end 2fe of the glass-face-side flange part 2. Therefore, the glass-face-side overlapping area O2 is provided over the whole range of the glass-face-side compressive region A2. However, the glass-face-side overlapping area O2 may be provided over a part of the range of the glass-face-side compressive region A2.

The second plate part 32 is not disposed in the glass-face-side tensile region B. Therefore, the glass-face-side tensile region B is made of a single material. Therefore, an increase of the weight can be reduced, and the weight of the front pillar outer 1 can be reduced by increasing the strength of the material.

The folding of each of the first plate part 31 and the second plate part 32 is achieved by cold pressing, for example. The folding of each of the first plate part 31 and the second plate part 32 can also be achieved by hot stamping. The first plate part 31 and the second plate part 32 can be separately formed in advance, and then each folded after the first member 11 and the second member 21 are overlaid on one another.

[Deformation Behavior of Front Pillar Outer 1 and Relationship Between Compressive Strain Region and Tensile Strain Region in Collision]

As described above, in the door-side overlapping area O1 that corresponds to the door-side compressive region A1, three layers of material are stacked on one another. In the glass-face-side overlapping area O2 that corresponds to the glass-face-side compressive region A2, three layers of material are also stacked on one another. On the other hand, the glass-face-side tensile region B is made of a single material. Therefore, the plate thickness of a compressive strain region (the door-side compressive region A1 and the glass-face-side compressive region A2) is substantially greater than a tensile strain region (the glass-face-side tensile region B) and the other areas. Therefore, the collision resistance of the compressive strain region is higher than that of the tensile strain region and the other areas.

Figure 5:
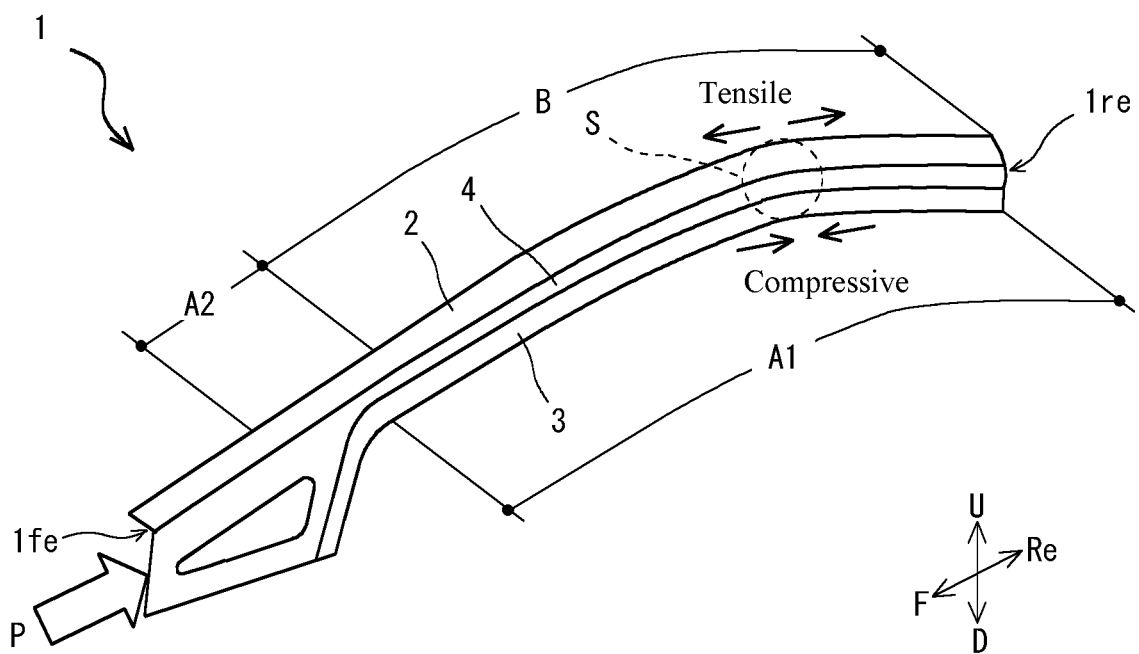
FIG. 5 is a perspective view of the front pillar outer on which a collision load is applied.

FIG. 5 is a perspective view of the front pillar outer 1 on which a collision load is applied. With reference to FIG. 5, in a state where the front pillar outer 1 is installed on an automobile, the fore end 1fe of the front pillar outer 1 is located at a lower position than the rear end 1re. In the case of a head-on collision of the automobile, a collision load P is applied to the fore end 1fe of the front pillar outer 1. The front pillar outer 1 has a curved shape, and is convex upward between the fore end 1fe and the rear end 1re. When the collision load P is applied to the front pillar outer 1, the stress is concentrated in the curved part of the front pillar outer 1, and the curved part is to be bent upward. As a result, a compressive stress occurs in the door-side flange part 3, and a compressive strain is exerted on the door-side flange part 3. On the other hand, a tensile stress occurs in the glass-face-side flange part 2, and a tensile strain is exerted on the glass-face-side flange part 2. The compressive stress occurring in the door-side flange part 3 and the tensile stress occurring in the glass-face-side flange part 2 exert a compressive strain on the glass-face-side flange part 2.

If the compressive strain excessively increases, the front pillar outer 1 buckles and is bent upward. If the front pillar outer 1 buckles, the collision energy absorption capacity of the front pillar outer 1 markedly decreases. Therefore, in order to increase the collision resistance of the front pillar outer 1, buckling of the front pillar outer 1 needs to be prevented.

To prevent buckling of the front pillar outer 1, it is effective to increase the collision resistance of the area of the door-side flange part 3 on which the compressive strain is exerted, that is, the door-side compressive region A1. Increasing the collision resistance of the area of the glass-face-side flange part 2 on which the compressive strain is exerted, that is, the glass-face-side compressive region A2, also contributes to the prevention of buckling of the front pillar outer 1.

With the front pillar outer 1, in an area S shown in FIG. 1, FIG. 2, and FIG. 5, the curvature of the door-side flange part 3 is large. The compressive strain is exerted on this area S. This area is the door-side compressive region A1. The compressive strain is also exerted on a part of the glass-face-side flange part 2. This area is the glass-face-side compressive region A2.

In the glass-face-side flange part 2, the tensile strain is exerted on an area at the rear of the glass-face-side compressive region A2. This area is the glass-face-side tensile region B.

The collision resistance (buckling strength) of the front pillar outer 1 largely depends on the plate thickness of the material of the compressive strain region. The plate thickness of the material of the tensile strain region has a smaller effect on the collision resistance of the front pillar outer 1 than the plate thickness of the material of the compressive strain region. Therefore, the plate thickness of the material of the glass-face-side tensile region B can be smaller than the plate thickness of the material of the door-side compressive region A1 and the glass-face-side compressive region A2.

Figure 6:
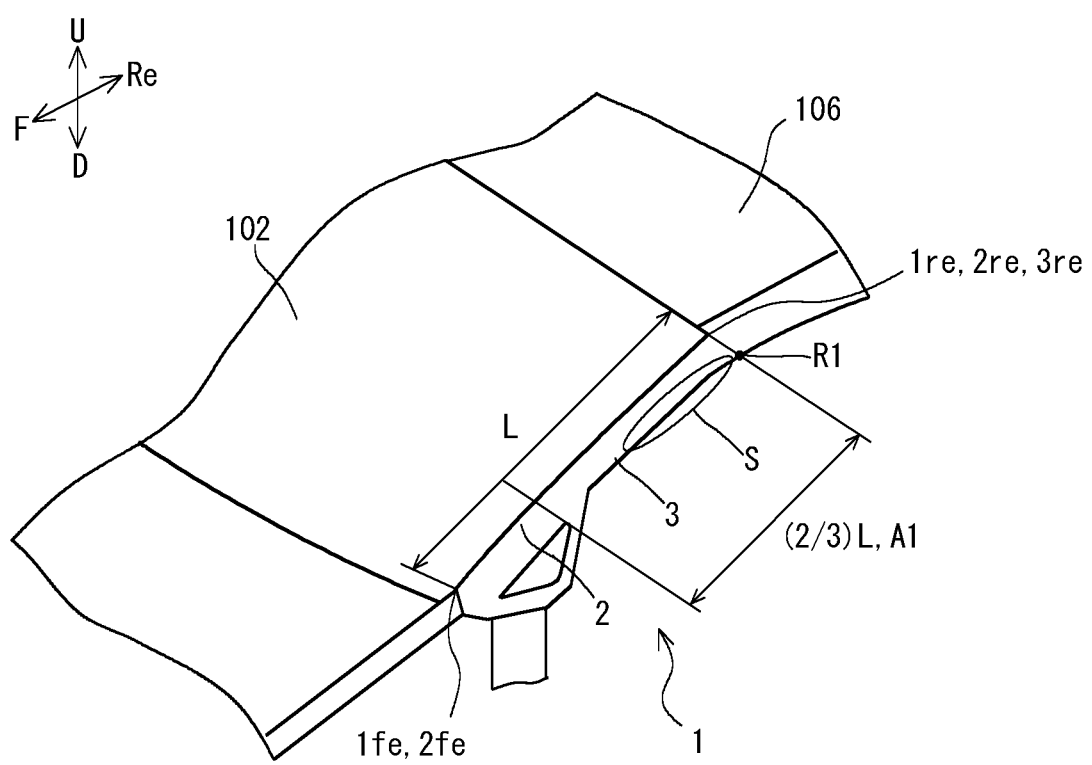
FIG. 6 is a schematic diagram showing a part of a vehicle body structure including the front pillar outer.

FIG. 6 is a schematic diagram showing a part of a vehicle body structure including the front pillar outer 1. In FIG. 6, illustration of the side panel of the front pillar is omitted. With reference to FIG. 6, the rear end of the front pillar is joined to a roof 106 of the vehicle. The roof 106 is provided to be approximately horizontal with respect to the ground. On the other hand, the windshield 102 of the vehicle is disposed to be inclined with respect to the ground. Therefore, the front pillar is curved in a part that is close to the rear end thereof. Accordingly, the front pillar outer 1 is also curved in a part that is close to the rear end $1re$ thereof.

When a collision load is applied to the front pillar outer 1, a large compressive strain is likely to occur in the door-side flange part 3 in the curved area S close to the rear end $1re$ of the front pillar outer 1. The shape of the front pillar outer 1 varies with the model. Therefore, the part in which a large compressive strain occurs varies with the model. In many cases, however, the area on which a compressive strain is exerted can be determined in a certain range. Specifically, as shown in FIG. 6, in the door-side flange part 3, a compressive strain is exerted in the range between a position R1 corresponding to the rear end $2re$ of the glass-face-side flange part 2 and a position at a distance of $L \times 2/3$ from the position R1 corresponding to the rear end $2re$ of the glass-face-side flange part 2. In short, this range is the range of the door-side compressive region A1. Here, L means the arc length (length in the longitudinal direction) of the glass-face-side flange part 2 of the front pillar outer 1 along the door-side edge thereof. The position R1 corresponds to the rear end $3re$ of the door-side flange part 3.

Therefore, as shown in FIG. 1, the door-side overlapping area O1 is provided over at least a part of the range of the door-side flange part 3 between the position R1 corresponding to the rear end $2re$ of the glass-face-side flange part 2 and the position at a distance of $L \times 2/3$ from the position R1 corresponding to the rear end $2re$ of the glass-face-side flange part 2. In other words, the door-side overlapping area O1 is provided over a part or the whole of the range of the door-side compressive region A1. FIG. 1 shows an example in which the door-side overlapping area O1 is provided over the whole range of the door-side compressive region A1.

Figure 7:
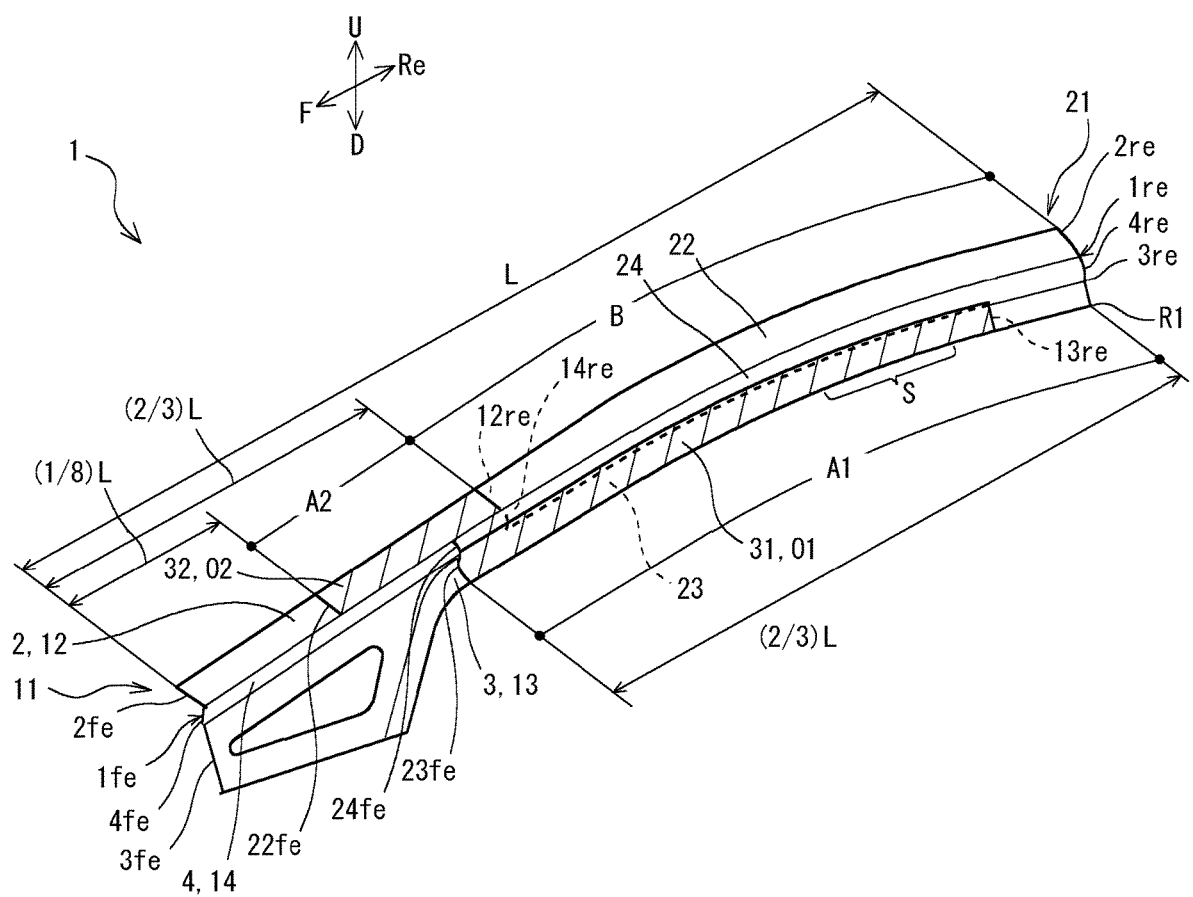
FIG. 7 is a perspective view of another example of the front pillar outer according to the embodiment.

FIG. 7 is a perspective view of another example of the front pillar outer 1 according to this embodiment. With the front pillar outer 1 shown in FIG. 7, the compressive strain is small in an area close to the rear end $3re$ of the door-side flange part 3. In this case, the first plate part 31 is not present in the area close to the rear end $3re$ of the door-side flange part 3. Therefore, the first door-side flange part 13 is not present in a part close to the rear end $3re$ of the door-side flange part 3. In other words, FIG. 7 shows an example in which the door-side overlapping area O1 is provided over a part of the door-side compressive region A1. In this case, the rear end $13re$ of the first door-side flange part 13 is located more forward than the rear end $1re$ of the front pillar outer 1.

With reference to FIG. 1, when a collision load is applied to the front pillar outer 1, a large compressive strain is likely to occur in the glass-face-side flange part 2 close to the fore end $1fe$ of the front pillar outer 1. The compressive strain is caused by a compressive stress occurring in the door-side flange part 3 and a tensile stress occurring in the glass-face-side flange part 2. In many cases, the area on which the compressive strain is exerted can be determined in a certain range. Specifically, as shown in FIG. 1, in the glass-face-side flange part 2, the compressive strain is exerted in the range between a position at a distance of $L \times 1/8$ from the fore end $2fe$ of the glass-face-side flange part 2 and a position at a distance of $L \times 2/3$ from the fore end $2fe$ of the glass-face-side flange part 2. In short, this range is the glass-face-side compressive region A2. Here, L means the arc length (length in the longitudinal direction) of the glass-face-side flange part 2 of the front pillar outer 1 along the door-side edge thereof.

Therefore, as shown in FIG. 1, the glass-face-side overlapping area O2 is provided over at least a part of the range of the glass-face-side flange part 2 between the position at a distance of $L \times 1/8$ from the fore end $2fe$ of the glass-face-side flange part 2 and the position at a distance of $L \times 2/3$ from the fore end $2fe$ of the glass-face-side flange part 2. In other words, the glass-face-side overlapping area O2 is provided over a part or the whole of the range of the glass-face-side compressive region A2. FIG. 1 shows an example in which the glass-face-side overlapping area O2 is provided over the whole range of the glass-face-side compressive region A2.

[Variation 1]

Figure 8:
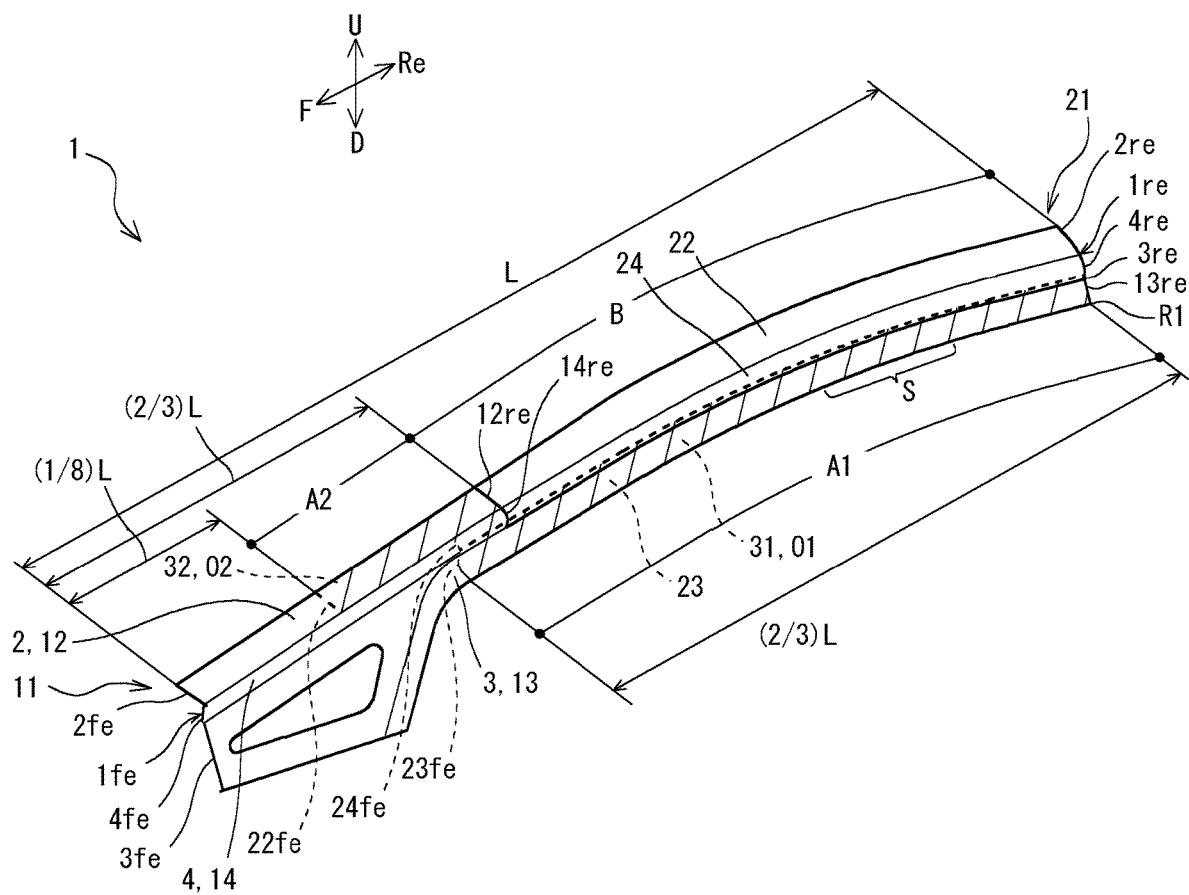
FIG. 8 is a perspective view of Variation 1 of the front pillar outer according to the embodiment.
Figure 9:
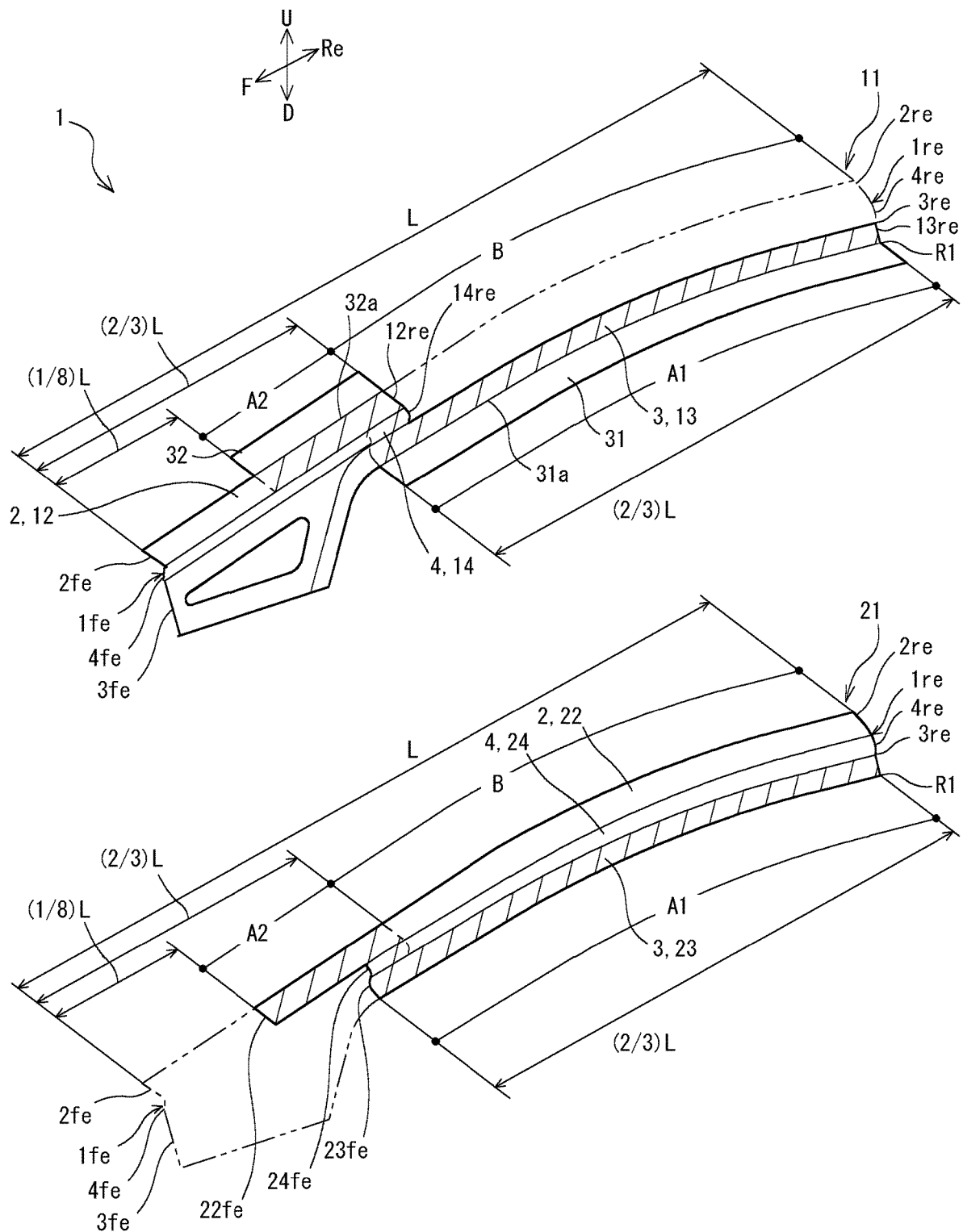
FIG. 9 is a perspective exploded view of the front pillar outer shown in FIG. 8.

FIG. 8 is a perspective view of Variation 1 of the front pillar outer 1 according to this embodiment. FIG. 9 is a perspective exploded view of the front pillar outer 1 shown in FIG. 8. With reference to FIG. 8 and FIG. 9, with Variation 1 of the front pillar outer 1, the first member 11 is overlaid on the second member 21. The first plate part 31 and the second plate part 32 are integral with the first member 11. In this case, the first plate part 31 is folded back so as to be hidden behind the front pillar outer 1, and is overlaid on the back surface of the second door-side flange part 23. Similarly, the second plate part 32 is folded back so as to be hidden behind the front pillar outer 1, and is overlaid on the back surface of the second glass-face-side flange part 22.

With Variation 1 of the front pillar outer 1, the second plate part 32 forms no step on the glass-face-side flange part 2. Therefore, an intimate contact can be ensured between the glass-face-side flange part 2 and the windshield 102.

[Variation 2]

Figure 10:
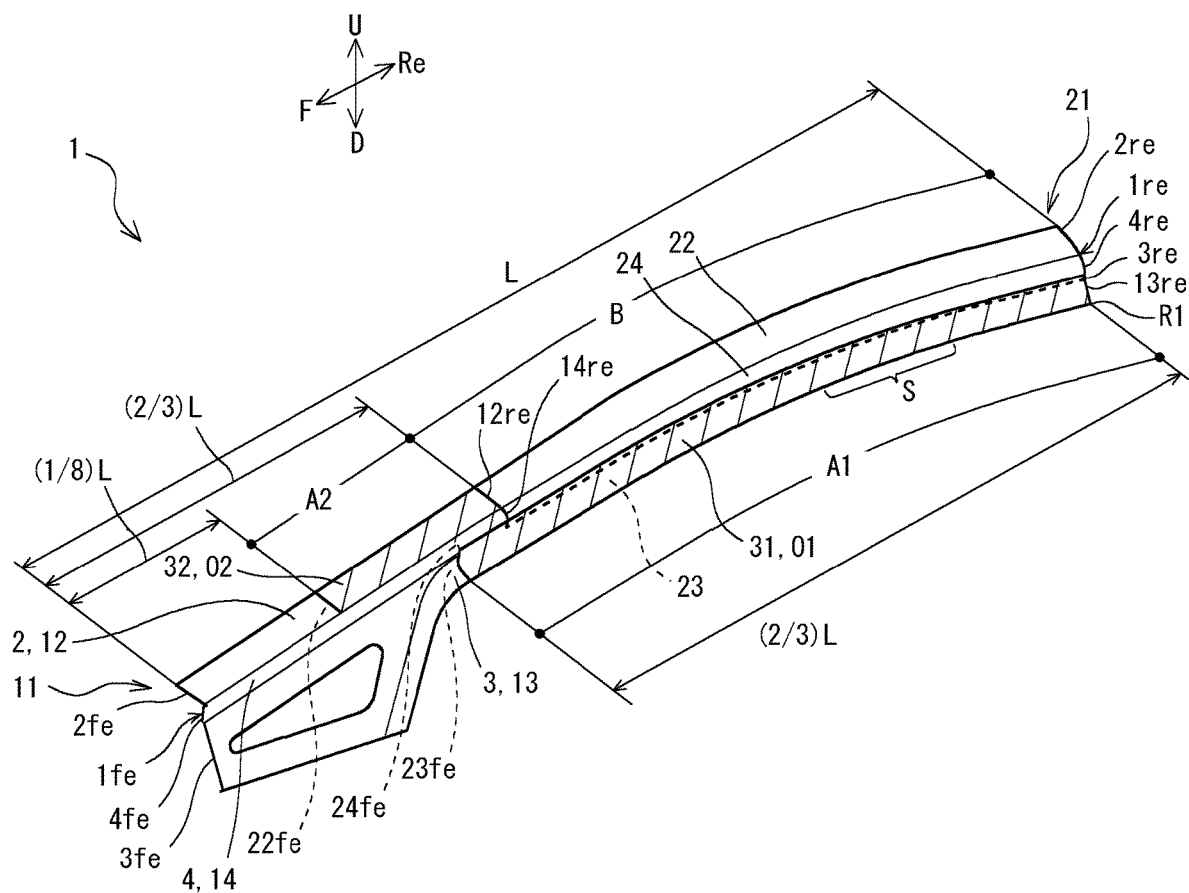
FIG. 10 is a perspective view of Variation 2 of the front pillar outer according to the embodiment.
Figure 11:
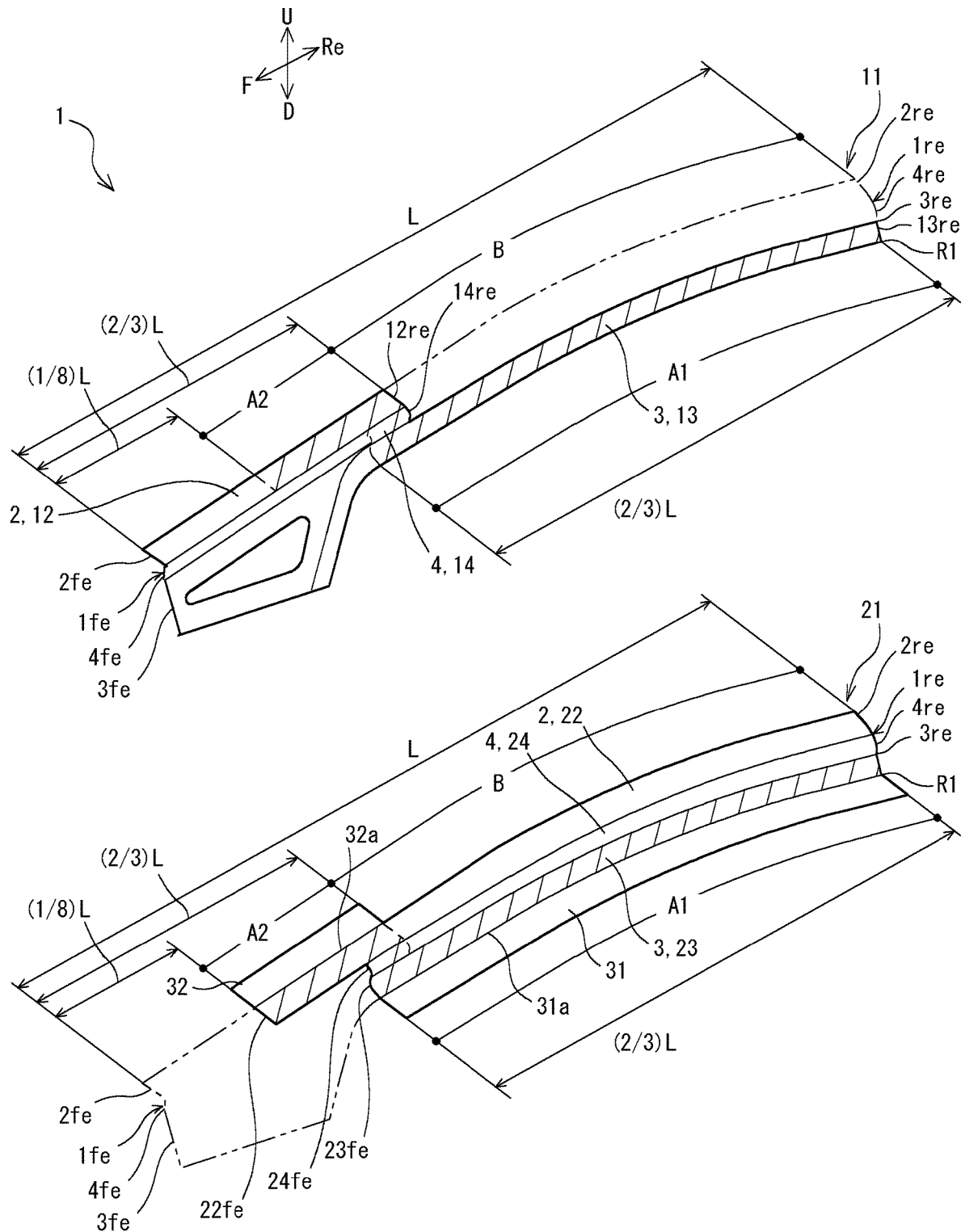
FIG. 11 is a perspective exploded view of the front pillar outer shown in FIG. 10.

FIG. 10 is a perspective view of Variation 2 of a front pillar outer 1 according to this embodiment. FIG. 11 is a perspective exploded view of the front pillar outer 1 shown in FIG. 10. With Variation 2 of the front pillar outer 1 shown in FIG. 10 and FIG. 11, the first member 11 is overlaid on the second member 21. The first plate part 31 and the second plate part 32 are integral with the second member 21. In this case, the first plate part 31 is folded so as to be exposed to the outside of the front pillar outer 1, and is overlaid on the front surface of the second door-side flange part 23. Similarly, the second plate part 32 is folded so as to be exposed to the outside of the front pillar outer 1, and is overlaid on the front surface of the second glass-face-side flange part 22.

[Plate Thickness]

With the front pillar outer 1, practically, the plate thickness of the first member 11 and the second member 21 is preferably 0.60 mm or more to 1.60 mm or less. When the plate thickness is 0.60 mm or more, a sufficient strength of the compressive strain region in which three layers of material are stacked on one another can be ensured. The same holds true for the tensile strain region and the other areas that are formed by a single layer of a single material (the first member 11 or the second member 21). On the other hand, when the plate thickness is 1.60 mm or less, an increase of the weight can be reduced. In addition, when the plate thickness is 1.60 mm or less, the folding of the first plate part 31 and the second plate part 32 can be performed without problems.

From the viewpoint of ensuring more sufficient strength, the lower limit of the plate thickness is more preferably 0.85 mm. On the other hand, from the viewpoint of further reducing the increase of the weight, the upper limit of the plate thickness is 1.05 mm. The plate thickness of the first member 11 may be the same as or different from the plate thickness of the second member 21. Any of the first member 11 and the second member 21 can be thicker than the other. However, in order to ensure the strength of the glass-face-side tensile region B formed by only the second member 21, the plate thickness of the second member 21 is preferably thicker than the plate thickness of the first member 11.

[Tensile Strength]

With the front pillar outer 1, the tensile strength (the strength of the material) of the first member 11 and the second member 21 is preferably 800 MPa or more. When the tensile strength is 800 MPa or more, the strength of the compressive strain region in which three layers of material are stacked on one another can be sufficiently improved. The same holds true for the tensile strain region and the other areas that are formed by a single layer of a single material (the first member 11 or the second member 21). The lower limit of the tensile strength is more preferably 1200 MPa, and even more preferably 1500 MPa. The tensile strength of the first member 11 may be the same as or different from the tensile strength of the second member 21. However, in order to ensure the strength of the glass-face-side tensile region B formed by only the second member 21, the tensile strength of the second member 21 is preferably higher than the tensile strength of the first member 11.

[Folding of First Plate Part 31 and Second Plate Part 32]

Folding of each of the first plate part 31 and the second plate part 32 is preferably achieved by cold pressing, since the cold pressing is easy.

However, when the first plate part 31 and the second plate part 32 are integral with the first member 11 as shown in FIG. 1 to FIG. 4, FIG. 8 and FIG. 9, for example, the first plate part 31 is connected to the first door-side flange part 13, and the second plate part 32 is connected to the first glass-face-side flange part 12. In this case, when folding the first plate part 31 onto the first door-side flange part 13, the first plate part 31 is folded at an acute angle at the side edge 31*a* of the first door-side flange part 13. As a result, the second door-side flange part 23 is sandwiched between the first door-side flange part 13 and the folded first plate part 31. Similarly, when folding the second plate part 32 onto the first glass-face-side flange part 12, the second plate part 32 is folded at an acute angle at the side edge 32*a* of the first glass-face-side flange part 12. As a result, the second glass-face-side flange part 22 is sandwiched between the first glass-face-side flange part 12 and the folded second plate part 32.

In this case, since the first plate part 31 is folded at an acute angle so that the second door-side flange part 23 is sandwiched between the first door-side flange part 13 and the folded first plate part 31, a crack can occur in the outer surface of the folded part of the first plate part 31. Similarly, since the second plate part 32 is folded at an acute angle so that the second glass-face-side flange part 22 is sandwiched between the first glass-face-side flange part 12 and the folded second plate part 32, a crack can occur in the outer surface of the folded part of the second plate part 32.

Furthermore, when the first plate part 31 and the second plate part 32 are integral with the second member 21 as shown in FIG. 10 and FIG. 11, for example, the first plate part 31 is connected to the second door-side flange part 23, and the second plate part 32 is connected to the second glass-face-side flange part 22. In this case, when folding the first plate part 31 onto the second door-side flange part 23, the first plate part 31 is folded at an acute angle at the side edge 31*a* of the second door-side flange part 23. As a result, the first door-side flange part 13 is sandwiched between the second door-side flange part 23 and the folded first plate part 31. Similarly, when folding the second plate part 32 onto the second glass-face-side flange part 22, the second plate part 32 is folded at an acute angle at the side edge 32*a* of the second glass-face-side flange part 22. As a result, the first glass-face-side flange part 12 is sandwiched between the second glass-face-side flange part 22 and the folded second plate part 32.

In this case, since the first plate part 31 is folded at an acute angle so that the first door-side flange part 13 is sandwiched between the second door-side flange part 23 and the folded first plate part 31, a crack can occur in the outer surface of the folded part of the first plate part 31. Similarly, since the second plate part 32 is folded at an acute angle so that the first glass-face-side flange part 12 is sandwiched between the second glass-face-side flange part 22 and the folded second plate part 32, a crack can occur in the outer surface of the folded part of the second plate part 32.

In short, in any of the cases described above, a crack can occur in the outer surface of the folded part of each of the plate parts 31 and 32.

Figure 12:
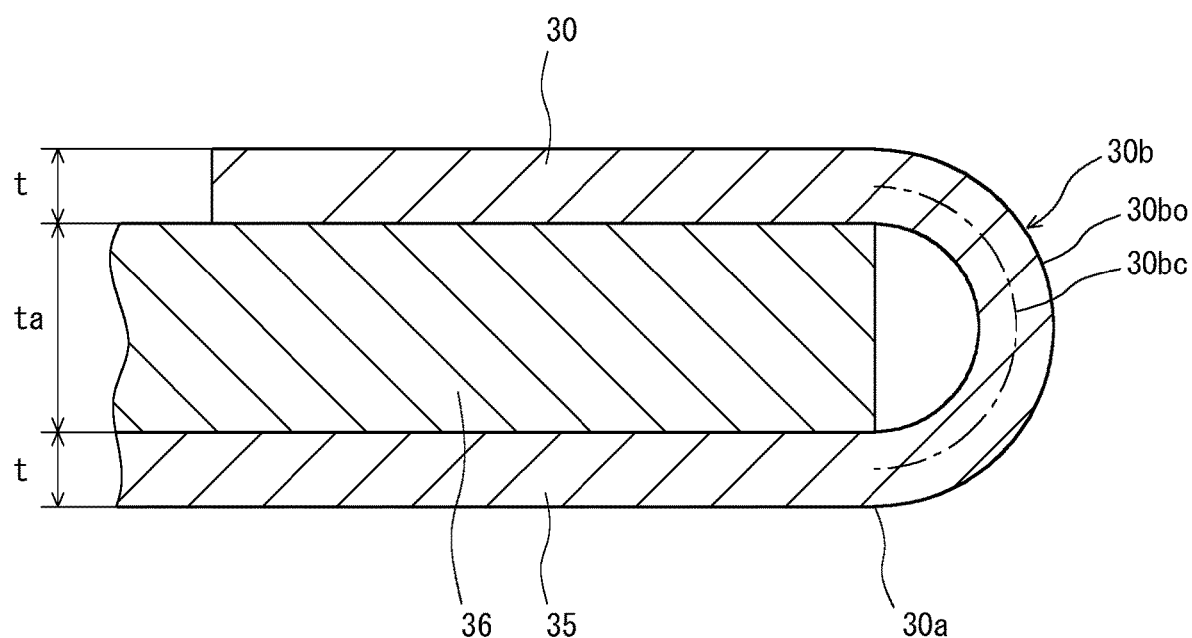
FIG. 12 is a cross-sectional view of a material overlapping area formed by folding.

FIG. 12 is a cross-sectional view of a material overlapping area formed by folding. FIG. 12 conceptually shows a cross section of the door-side overlapping area O1 and the glass-face-side overlapping area O2 described above.

With reference to FIG. 12, in the material overlapping area, a sandwiching flange part 36 is overlaid on a folding flange part 35. A plate part 30 is connected to a side edge 30a of the folding flange part 35. The plate part 30 is folded onto the folding flange part 35, and the sandwiching flange part 36 is sandwiched between the folding flange part 35 and the plate part 30.

The plate part 30 corresponds to the first plate part 31 and the second plate part 32. The folding flange part 35 corresponds to the first door-side flange part 13 or the second door-side flange part 23 connected to the first plate part 31. The folding flange part 35 also corresponds to the first glass-face-side flange part 12 or the second glass-face-side flange part 22 connected to the second plate part 32.

If the plate part 30 is the first plate part 31, and the folding flange part 35 is the first door-side flange part 13, for example, the sandwiching flange part 36 corresponds to the second door-side flange part 23. If the plate part 30 is the first plate part 31, and the folding flange part 35 is the second door-side flange part 23, the sandwiching flange part 36 corresponds to the first door-side flange part 13. If the plate part 30 is the second plate part 32, and the folding flange part 35 is the first glass-face-side flange part 12, the sandwiching flange part 36 corresponds to the second glass-face-side flange part 22. If the plate part 30 is the second plate part 32, and the folding flange part 35 is the second glass-face-side flange part 22, the sandwiching flange part 36 corresponds to the first glass-face-side flange part 12.

As shown in FIG. 12, the plate part 30 is folded in such a manner that the sandwiching flange part 36 is sandwiched between the folding flange part 35 and the folded plate part 30. In this process, the plate part 30 is folded at an acute angle, and a folded part 30b is formed. In the folded part 30b, a plane 30bc in the middle of the plate thickness is curved with a constant radius of curvature. The plane 30bc in the middle of the plate thickness is on the neutral axis of the folding deformation, and therefore, the circumferential length of the cross section thereof does not differ between before and after the folding.

On the other hand, in the folded part 30b, an outer surface 30bo is curved with a constant radius of curvature. Since the circumferential length of the cross section of the plane 30bc in the middle of the plate thickness does not differ between before and after the folding, the circumferential length of the cross section of the outer surface 30bo differs between before and after the folding. Specifically, the circumferential length of the cross section of the outer surface 30bo is longer after the folding than before the folding. In other words, the outer surface 30bo of the folded part 30b is expanded by the folding. This is a cause of a crack occurring in the outer surface 30bo of the folded part 30b of the plate part 30.

In order to prevent occurrence of such a crack, the material characteristics of the folding flange part 35 and the sandwiching flange part 36 can be appropriately set.

Specifically, the plate thickness of the folding flange part 35 will be denoted by t, and the plate thickness of the sandwiching flange part 36 will be denoted by ta. The plate thickness of the plate part 30 is the same as the plate thickness t of the folding flange part 35. Then, in the folded part 30b, the circumferential length of the cross section of the plane 30bc in the middle of the plate thickness is expressed by "$\pi \times (t+ta)$". The circumferential length of the cross section of the outer surface 30bo is expressed by "$\pi \times (2 \times t+ta)$".

In this case, a strain (true strain) ε of an outer layer of the outer surface 30bo of the folded part 30b is expressed by the following formula (a).

$$\varepsilon = \ln((2 \times t + ta)/(t + ta)) \tag{a}$$

The material of the folding flange part 35 has an ultimate deformability |εt| as an intrinsic physical property value. A condition for preventing occurrence of a crack is that the absolute value |ε| of the strain ε expressed by the above formula (a) is smaller than the ultimate deformability |εt|. In other words, a condition for preventing occurrence of a crack is that the condition expressed by the following formula (b) is satisfied. Another condition is that a uniform elongation εu of the material of the folding flange part 35 is 5%.

$$|\varepsilon t| > |\varepsilon| = |\ln((2 \times t + ta)/(t + ta))| \tag{b}$$

Note that the ultimate deformability |εt| of the material can be measured in a well-known method, such as the grooved tensile test. The grooved tensile test involves making a plate break off by pulling the plate in a state of plane strain, in which no decrease of the plate width occurs. Provided that the original plate thickness is t0, and the plate thickness of the broken-off part is t1, εt is expressed by the following formula (c).

$$\varepsilon t = \ln(t1/t0) \tag{c}$$

The ultimate deformability |εt| can also be measured in the Nakajima method, the Marciniak method or the like.

Based on the above description, the following case will be considered. In other words, the plate part 30 is the first plate part 31, and the folding flange part 35 is one of the door-side flange parts (the first door-side flange part 13, for example) connected to the first plate part 31. The plate thickness of the first material is tD. The sandwiching flange part 36 is the other door-side flange part (the second door-side flange part 23, for example). The plate thickness of the sandwiching flange part 36 is taD. In this case, the following conditions are derived.

According to the above formula (b), the ultimate deformability |εtD| of the first material needs to satisfy the condition expressed by the formula (1). Furthermore, the uniform elongation εuD of the first material needs to be 5% or more.

$$|\varepsilon tD| > \ln((2 \times tD + taD)/(tD + taD)) \tag{1}$$

Furthermore, the following case will be considered. In other words, the plate part 30 is the second plate part 32, and the folding flange part 35 is one of the glass-face-side flange parts (the first glass-face-side flange part 12, for example) connected to the second plate part 32. The plate thickness of the second material is tG. The sandwiching flange part 36 is the other glass-face-side flange part (the second glass-face-side flange part 22, for example). The plate thickness of the sandwiching flange part 36 is taG. In this case, the following conditions are derived.

According to the above formula (b), the ultimate deformability |εtG| of the second material needs to satisfy the condition expressed by the formula (2). Furthermore, the uniform elongation εuG of the second material needs to be 5% or more.

$$|\varepsilon tG| > \ln((2 \times tG + taG)/(tG + taG)) \quad (2)$$

When the first material and the second material satisfy the conditions described above, a crack can be prevented from occurring in the folded part of each of the first plate part 31 and the second plate part 32 even if the folding is achieved by cold pressing. Of course, the folding of each of the first plate part 31 and the second plate part 32 can also be achieved by hot stamping. In the case where the folding is achieved by hot stamping, the temperature of the material is high during the processing, and therefore, the ductility of the material is high. Therefore, no crack occurs in the folded part.

Example 1

To check the effectiveness of the front pillar outer according to this embodiment, computer aided engineering (CAE) analysis was performed. To evaluate the collision resistance, a collision test was simulated by CAE analysis. As models of Invention Examples 1 to 8, the front pillar outer 1 shown in FIG. 1 was fabricated. In other words, both the first plate part and the second plate part were integral with the first member. The models of Invention Examples 1 to 8 differ in plate thickness of the first member and plate thickness of the second member. As a model of Comparative Example, a front pillar outer formed from a single plate material was fabricated. A fixed tensile strength of 1500 (MPa) was used for all the models.

[Analysis Conditions]

Figure 13:
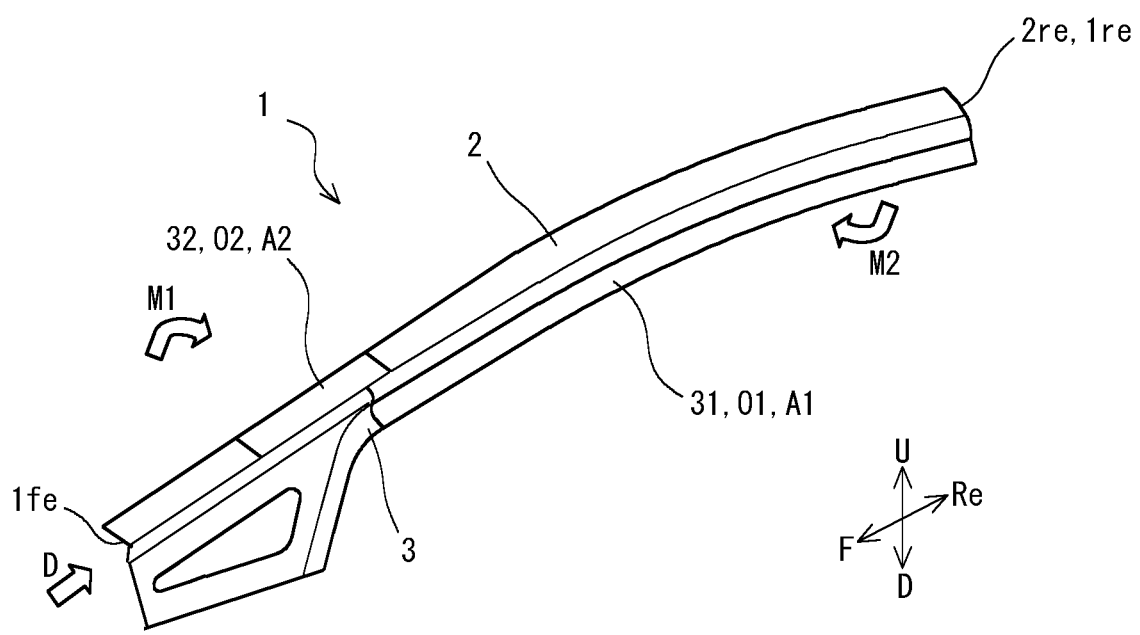
FIG. 13 is a schematic diagram for illustrating analysis conditions in Examples.

FIG. 13 is a schematic diagram for illustrating analysis conditions in Examples. With reference to FIG. 13, a displacement D in the longitudinal direction of the front pillar outer 1 was exerted on the fore end 1fe of the front pillar outer 1. On the other hand, the rear end 2re of the glass-face-side flange part 2 was fixed.

The displacement D caused bending moment M1 in the vicinity of the fore end 1fe of the front pillar outer 1. The direction of the bending moment M1 was clockwise when viewed from the left of the vehicle. It was assumed that the displacement D was positive when the displacement D was in the direction from the fore end 1fe to the rear end 1re of the front pillar outer 1. The displacement D caused a bending moment M2 in the rear end 2re of the glass-face-side flange part 2. The direction of the bending moment M2 was clockwise, as with the bending moment M1, when viewed from the left of the vehicle.

[Evaluation Method]

For each model, the load at the time when buckling occurred because of the exertion of the displacement D, that is, the maximum load, was investigated. Furthermore, the increase in percentage of the maximum load for each model was calculated with respect to the maximum load for the model of Comparative Example. The weight of each model was investigated. Furthermore, the decrease in percentage of the weight of each model was calculated with respect to the weight of the model of Comparative Example. The models were evaluated by comparison of the increase ratio of the maximum load and the weight reduction ratio.

[Results]

Table 1 below shows the results.

TABLE 1

| Example | Plate Thickness of First Member (mm) | Plate Thickness of Second Member (mm) | Weight Reduction Ratio (%) | Increase Ratio of Maximum Load (%) |
|---|---|---|---|---|
| Comparative Example | 1.25 | — | 0 (Reference) | 0 (Reference) |
| Invention Example 1 | 0.85 | 0.60 | 38 | 3 |
| Invention Example 2 | 0.95 | 0.60 | 37 | 9 |
| Invention Example 3 | 1.05 | 0.60 | 35 | 17 |
| Invention Example 4 | 1.15 | 0.60 | 34 | 26 |
| Invention Example 5 | 1.25 | 0.60 | 32 | 35 |
| Invention Example 6 | 1.25 | 0.70 | 24 | 39 |
| Invention Example 7 | 1.25 | 0.80 | 16 | 43 |
| Invention Example 8 | 1.25 | 0.90 | 8 | 48 |

The results in Table 1 show the following conclusions. The weight reduction ratio was more than 0 for all Invention Examples 1 to 8. In other words, the front pillar outers of Invention Examples 1 to 8 were lighter than the front pillar outer of Comparative Example. The increase ratio of the maximum load was more than 0 for all Invention Examples 1 to 8. In other words, the front pillar outers of Invention Examples 1 to 8 were improved in collision resistance (buckling strength) over the front pillar outer of Comparative Example.

Example 2

As in Example 1, CAE analysis was performed. In the models of Invention Examples 11 to 19 in Example 2, the first plate part was integral with the second member, and the second plate part was integral with the first member. Furthermore, with the models of Invention Examples 11 to 19, the first members had the same plate thickness of 1.05 mm, the second members had the same plate thickness of 0.60 mm, and the area in which the first plate part was provided and the area in which the second plate part was provided differed between the models. As a model of Comparative Example in Example 2, the model of Comparative Example in Example 1 (plate thickness: 1.25 mm) was used. Table 2 below shows conditions for the models that are different from those in Example 1. The other conditions were the same as those in Example 1.

TABLE 2

| Example | Area in which First Plate Part is Provided | Area in which Second Plate Part is Provided | Weight Reduction Ratio (%) | Increase Ratio of Maximum Load (%) |
|---|---|---|---|---|
| Comparative Example | Not Provided | Not Provided | 0 (Reference) | 0 (Reference) |
| Invention Example 11 | Part of Forward Area of A1 | Part of Forward Area of A2 | 60.1 | 6.2 |

TABLE 2-continued

| Example | Area in which First Plate Part is Provided | Area in which Second Plate Part is Provided | Weight Reduction Ratio (%) | Increase Ratio of Maximum Load (%) |
|---|---|---|---|---|
| Invention Example 12 | Part of A1 | Part of Forward Area of A2 | 55.4 | 7.4 |
| Invention Example 13 | Whole of A1 | Part of Forward Area of A2 | 51.9 | 8.8 |
| Invention Example 14 | Part of Forward Area of A1 | Part of A2 | 48.7 | 9.2 |
| Invention Example 15 | Part of Forward Area of A1 | Whole of A2 | 45.6 | 10.8 |
| Invention Example 16 | Part of A1 | Part of A2 | 41.2 | 11.7 |
| Invention Example 17 | Part of A1 | Whole of A2 | 40.8 | 13.6 |
| Invention Example 18 | Whole of A1 | Part of A2 | 38.2 | 15.7 |
| Invention Example 19 | Whole of A1 | Whole of A2 | 37.0 | 19.0 |

The results in Table 2 show the following conclusions. The weight reduction ratio was more than 0 for all Invention Examples 11 to 19. In other words, the front pillar outers of Invention Examples 11 to 19 were lighter than the front pillar outer of Comparative Example. The increase ratio of the maximum load was more than 0 for all Invention Examples 11 to 19. In other words, the front pillar outers of Invention Examples 11 to 19 were improved in collision resistance (buckling strength) over the front pillar outer of Comparative Example.

Example 3

As in Example 1, CAE analysis was performed. In the models of Invention Examples 21 to 29 in Example 3, both the first plate part and the second plate part were integral with the first member, as in Example 1. The other conditions were the same as those in Example 2.

TABLE 3

| Example | Area in which First Plate Part is Provided | Area in which Second Plate Part is Provided | Weight Reduction Ratio (%) | Increase Ratio of Maximum Load (%) |
|---|---|---|---|---|
| Comparative Example | Not Provided | Not Provided | 0 (Reference) | 0 (Reference) |
| Invention Example 21 | Part of Forward Area of A1 | Part of Forward Area of A2 | 57.1 | 6.8 |
| Invention Example 22 | Part of A1 | Part of Forward Area of A2 | 52.6 | 8.1 |
| Invention Example 23 | Whole of A1 | Part of Forward Area of A2 | 49.3 | 9.7 |
| Invention Example 24 | Part of Forward Area of A1 | Part of A2 | 46.3 | 10.1 |
| Invention Example 25 | Part of Forward Area of A1 | Whole of A2 | 43.3 | 11.9 |
| Invention Example 26 | Part of A1 | Part of A2 | 39.1 | 12.9 |
| Invention Example 27 | Part of A1 | Whole of A2 | 38.8 | 15.0 |
| Invention Example 28 | Whole of A1 | Part of A2 | 36.3 | 16.0 |
| Invention Example 29 | Whole of A1 | Whole of A2 | 35.0 | 17.0 |

The results in Table 3 show the following conclusions. The weight reduction ratio was more than 0 for all Invention Examples 21 to 29. In other words, the front pillar outers of Invention Examples 21 to 29 were lighter than the front pillar outer of Comparative Example. The increase ratio of the maximum load was more than 0 for all Invention Examples 21 to 29. In other words, the front pillar outers of Invention Examples 21 to 29 were improved in collision resistance (buckling strength) over the front pillar outer of Comparative Example.

Example 4

As in Example 1, CAE analysis was performed. In the models of Invention Examples 31 to 39 in Example 4, both the first plate part and the second plate part were integral with the second member, unlike Examples 1 and 3. The other conditions were the same as those in Example 2.

TABLE 4

| Example | Area in which First Plate Part is Provided | Area in which Second Plate Part is Provided | Weight Reduction Ratio (%) | Increase Ratio of Maximum Load (%) |
|---|---|---|---|---|
| Comparative Example | Not Provided | Not Provided | 0 (Reference) | 0 (Reference) |
| Invention Example 31 | Part of Forward Area of A1 | Part of Forward Area of A2 | 72.1 | 5.0 |
| Invention Example 32 | Part of A1 | Part of Forward Area of A2 | 66.5 | 5.9 |
| Invention Example 33 | Whole of A1 | Part of Forward Area of A2 | 62.3 | 7.0 |
| Invention Example 34 | Part of Forward Area of A1 | Part of A2 | 58.4 | 7.4 |
| Invention Example 35 | Part of Forward Area of A1 | Whole of A2 | 54.7 | 8.6 |
| Invention Example 36 | Part of A1 | Part of A2 | 49.4 | 9.4 |
| Invention Example 37 | Part of A1 | Whole of A2 | 49.0 | 10.9 |
| Invention Example 38 | Whole of A1 | Part of A2 | 45.8 | 12.6 |
| Invention Example 39 | Whole of A1 | Whole of A2 | 42.0 | 13.6 |

The results in Table 4 show the following conclusions. The weight reduction ratio was more than 0 for all Invention Examples 31 to 39. In other words, the front pillar outers of Invention Examples 31 to 39 were lighter than the front pillar outer of Comparative Example. The increase ratio of the maximum load was more than 0 for all Invention Examples 31 to 39. In other words, the front pillar outers of Invention Examples 31 to 39 were improved in collision resistance (buckling strength) over the front pillar outer of Comparative Example.

The results of the examples 1 to 4 prove that the front pillar outer according to this embodiment is reduced in weight and improved in strength. In particular, the results of Examples 2 to 4 prove that the reduction in weight and the improvement in strength can be more effectively achieved if the area in which the first plate part is provided, that is, the door-side overlapping area O1, is provided over a part or the whole of the door-side compressive region A1, and the area in which the second plate part is provided, that is, the glass-face-side overlapping area O2, is provided over a part or the whole of the glass-face-side compressive region A2.

Example 5

Considering the folding of the first plate part and the second plate part, the following experiments were performed. In each of Reference Examples 1 to 3 and Invention Examples a to i, a set of a plate-like folding material and a plate-like sandwiching material was prepared. The folding material corresponded to the folding flange part, and the plate parts (the first plate part and the second plate part) connected to the folding flange part. The sandwiching material corresponded to the sandwiching flange part sandwiched between the folding flange part and the folded plate part. In the experiments, the folding materials differed in properties (ultimate deformability |εt|, uniform elongation εu, and plate thickness t), and the sandwiching materials differed in plate thickness ta.

In each experiment, first, a punch was pressed into the plate-like folding material to bend the folding material into a 90-degree V-shape. In the cross section of the punch, the radius of curvature of the front edge part of the punch was 5 mm. The sandwiching material was then inserted into the folding material bent in the V shape, and after that, the folding material was further bent and folded to sandwich the sandwiching material. All the bendings were performed in the cold condition. After that, the folded part of the folding material was observed to check whether a crack had occurred or not. Table 5 below shows the results.

of the folding material and the sandwiching material, that is, |εt|, t, and ta, satisfied the relationship of the above formula (b), and εu of the folding material was 5% or more. On the other hand, in Reference Examples 1 to 3, these conditions were not satisfied. Therefore, a crack occurred in the folded part of the folding material. However, in Reference Examples 1 to 3, the folding material was also able to be folded to sandwich the sandwiching material. Of course, in Invention Examples a to i, the folding material was able to be folded to sandwich the sandwiching material.

The results in Example 5 prove that, with the front pillar outer according to this embodiment, the first plate part and the second plate part can be folded without causing a crack if the predetermined conditions described above are satisfied.

An embodiment of the present invention has been described above. However, the embodiment described above is just an example of the mode for carrying out the present invention. Therefore, the present invention is not limited to the embodiment described above, and modifications can be made to the embodiment described above as required without departing from the spirit of the present invention.

REFERENCE SIGNS LIST 1 front pillar outer
1*fe* fore end of front pillar outer
1*re* rear end of front pillar outer
2 glass-face-side flange part
2*fe* fore end of glass-face-side flange part
2*re* rear end of glass-face-side flange part
3 door-side flange part
3*fe* fore end of door-side flange part
3*re* rear end of door-side flange part
4 main body part
4*fe* fore end of main body part
4*re* rear end of main body part
11 first member
12 first glass-face-side flange part
12*re* rear end of first glass-face-side flange part
13 first door-side flange part
13*re* rear end of first door-side flange part
14 first main body part
14*re* rear end of first main body part
21 second member

TABLE 5

| Example | Properties of Folding Material | | | Plate Thickness of Sandwiching Material ta (mm) | Outer Layer Strain of Folded Part ε | Crack |
|---|---|---|---|---|---|---|
| | |εt| | Uniform Elongation εu (%) | Plate Thickness t (mm) | | | |
| Reference Example 1 | 0.35 | 3.3 | 1.25 | 0.60 | 0.52 | Occurred |
| Reference Example 2 | 0.36 | 6.9 | 1.25 | 0.60 | 0.52 | Occurred |
| Reference Example 3 | 0.55 | 3.4 | 1.25 | 0.60 | 0.52 | Occurred |
| Invention Example a | 0.47 | 5.5 | 0.85 | 0.60 | 0.46 | Not Occurred |
| Invention Example b | 0.49 | 6.5 | 0.95 | 0.60 | 0.48 | Not Occurred |
| Invention Example c | 0.51 | 7.2 | 1.05 | 0.60 | 0.49 | Not Occurred |
| Invention Example d | 0.52 | 5.6 | 1.15 | 0.60 | 0.51 | Not Occurred |
| Invention Example e | 0.55 | 5.9 | 1.25 | 0.60 | 0.52 | Not Occurred |
| Invention Example f | 0.52 | 6.7 | 1.25 | 0.70 | 0.50 | Not Occurred |
| Invention Example g | 0.50 | 6.2 | 1.25 | 0.80 | 0.48 | Not Occurred |
| Invention Example h | 0.50 | 6.9 | 1.25 | 0.90 | 0.46 | Not Occurred |
| Invention Example i | 0.45 | 6.8 | 0.60 | 1.05 | 0.31 | Not Occurred |

The results in Table 5 show the following conclusions. In Invention Examples a to i, no crack occurred in the folded part of the folding material. This was because the properties 22 second glass-face-side flange part
22*fe* fore end of second glass-face-side flange part
23 second door-side flange part 23fe fore end of second door-side flange part
24 second main body part
24fe fore end of second main body part
25 ridge part
26 ridge part
30 plate part
30a side edge
31 first plate part
31a side edge
32 second plate part
32a side edge
35 folding flange part
36 sandwiching flange part
A1 door-side compressive region
A2 glass-face-side compressive region
B glass-face-side tensile region
O1 door-side overlapping area
O2 glass-face-side overlapping area
101 front pillar
102 windshield
103 door
104 side panel
105 front pillar inner
106 roof

The invention claimed is:

1. A front pillar outer including a glass-face-side flange part, a door-side flange part, and a main body part that connects the glass-face-side flange part and the door-side flange part to each other,
wherein the front pillar outer comprises:
  a first member that extends in a longitudinal direction from a fore end toward a rear end of the front pillar outer and includes a first glass-face-side flange part that forms a part of the glass-face-side flange part, a first door-side flange part that forms a part of the door-side flange part, and a first main body part that forms a part of the main body part and connects the first glass-face-side flange part and the first door-side flange part to each other; and
  a second member that extends in the longitudinal direction from the rear end toward the fore end of the front pillar outer and includes a second glass-face-side flange part that forms a part of the glass-face-side flange part, a second door-side flange part that forms a part of the door-side flange part, and a second main body part that forms a part of the main body part and connects the second glass-face-side flange part and the second door-side flange part to each other,
  a rear end of the first door-side flange part is located more rearward than a rear end of the first glass-face-side flange part and a rear end of the first main body part,
  a fore end of the second glass-face-side flange part is located more forward than a fore end of the second door-side flange part and a fore end of the second main body part,
  the first door-side flange part and the second door-side flange part overlap with each other in an area from the rear end of the first door-side flange part to the fore end of the second door-side flange part,
  the first glass-face-side flange part and the second glass-face-side flange part overlap with each other in an area from the rear end of the first glass-face-side flange part to the fore end of the second glass-face-side flange part,
  the first main body part and the second main body part overlap with each other in an area from the rear end of the first main body part to the fore end of the second main body part,
  in the area in which the first door-side flange part and the second door-side flange part overlap with each other, a first plate part that is connected to a side edge of one door-side flange part of the first door-side flange part and the second door-side flange part is folded so that the other door-side flange part is sandwiched between the one door-side flange part and the folded first plate part, and
  in the area in which the first glass-face-side flange part and the second glass-face-side flange part overlap with each other, a second plate part that is connected to a side edge of one glass-face-side flange part of the first glass-face-side flange part and the second glass-face-side flange part is folded so that the other glass-face-side flange part is sandwiched between the one glass-face-side flange part and the folded second plate part.

2. The front pillar outer according to claim 1, wherein
provided that a length of the glass-face-side flange part is denoted by L,
the area in which the first plate part, the first door-side flange part, and the second door-side flange part overlap with each other is provided in the door-side flange part over a part of a range between a position corresponding to a rear end of the glass-face-side flange part and a position at a distance of $L \times 2/3$ from the position corresponding to the rear end of the glass-face-side flange part.

3. The front pillar outer according to claim 1, wherein
provided that a length of the glass-face-side flange part is denoted by L,
the area in which the first plate part, the first door-side flange part, and the second door-side flange part overlap with each other is provided in the door-side flange part over the whole of a range between a position corresponding to a rear end of the glass-face-side flange part and a position at a distance of $L \times 2/3$ from the position corresponding to the rear end of the glass-face-side flange part.

4. The front pillar outer according to claim 1, wherein
provided that a length of the glass-face-side flange part is denoted by L,
the area in which the second plate part, the first glass-face-side flange part, and the second glass-face-side flange part overlap with each other is provided over a part of a range between a position at a distance of $L \times 1/8$ from a fore end of the glass-face-side flange part and a position at a distance of $L \times 2/3$ from the fore end of the glass-face-side flange part.

5. The front pillar outer according to claim 1, wherein
provided that a length of the glass-face-side flange part is denoted by L,
the area in which the second plate part, the first glass-face-side flange part, and the second glass-face-side flange part overlap with each other is provided over the whole of a range between a position at a distance of $L \times 1/8$ from a fore end of the glass-face-side flange part and a position at a distance of $L \times 2/3$ from the fore end of the glass-face-side flange part.

6. The front pillar outer according to claim 1, wherein
the one door-side flange part connected to the first plate part is the first door-side flange part, and the other door-side flange part is the second door-side flange part, and
the one glass-face-side flange part connected to the second plate part is the first glass-face-side flange part, and the other glass-face-side flange part is the second glass-face-side flange part.

7. The front pillar outer according to claim 1, wherein
the one door-side flange part connected to the first plate part is the second door-side flange part, and the other door-side flange part is the first door-side flange part, and
the one glass-face-side flange part connected to the second plate part is the second glass-face-side flange part, and the other glass-face-side flange part is the first glass-face-side flange part.

8. The front pillar outer according to claim 1, wherein
provided that a plate thickness of a first material forming the first plate part and the one door-side flange part connected to the first plate part is denoted by tD, and a plate thickness of the other door-side flange part is denoted by taD, an ultimate deformability |εtD| of the first material satisfies a condition expressed by a formula (1), and an uniform elongation εuD of the first material is 5% or more, and
provided that a plate thickness of a second material forming the second plate part and the one glass-face-side flange part connected to the second plate part is denoted by tG, and a plate thickness of the glass-face-side flange part is denoted by taG, an ultimate deformability |εtG| of the second material satisfies a condition expressed by a formula (2), and an uniform elongation εuG of the second material is 5% or more:

$$|\varepsilon tD| > \ln((2 \times tD + taD)/(tD + taD)) \quad (1)$$

$$|\varepsilon tG| > \ln((2 \times tG + taG)/(tG + taG)) \quad (2).$$

* * * * *